(12) United States Patent
Trojahn

(10) Patent No.: US 7,306,066 B2
(45) Date of Patent: Dec. 11, 2007

(54) AIR CUSHION VEHICLE AND GAME

(76) Inventor: Charles J. Trojahn, 2075 Amwall Rd., Somerset, NJ (US) 08873-7220

( * ) Notice: Subject to any disclaimer, the term of this patent is extended or adjusted under 35 U.S.C. 154(b) by 121 days.

(21) Appl. No.: 11/037,751

(22) Filed: Jan. 18, 2005

(65) Prior Publication Data
US 2006/0169508 A1    Aug. 3, 2006

(51) Int. Cl.
B60V 1/11    (2006.01)
(52) U.S. Cl. .................. 180/117; 180/120; 180/127; 180/129
(58) Field of Classification Search ........ 180/116–121; 244/12.5, 23 D, 51, 52; 239/265.19; 273/108.1, 273/129 R; 446/435, 424
See application file for complete search history.

(56) References Cited

U.S. PATENT DOCUMENTS

| | | | |
|---|---|---|---|
| 2,969,937 A | 1/1961 | Trojahn | |
| 3,548,969 A | 12/1970 | Paull | |
| 3,589,058 A | 6/1971 | Labat | |
| 3,589,467 A | 6/1971 | Swendsrud | |
| 3,765,357 A * | 10/1973 | Peri | 114/67 A |
| 3,861,491 A * | 1/1975 | Ferguson | 180/120 |
| 3,885,502 A * | 5/1975 | Samo et al. | 104/53 |
| 3,920,203 A * | 11/1975 | Moorehead | 244/207 |
| 4,071,207 A * | 1/1978 | Piasecki et al. | 244/23 D |
| 4,175,636 A * | 11/1979 | Broughton | 180/119 |
| 4,313,512 A | 2/1982 | Jutras | |
| 4,438,588 A | 3/1984 | Martin | |
| 4,593,906 A * | 6/1986 | Sharma | 273/129 R |
| 4,964,835 A | 10/1990 | Suto | |
| 5,045,013 A | 9/1991 | Fujitani | |
| 5,169,156 A | 12/1992 | Smollar | |
| 5,267,626 A * | 12/1993 | Tanfield, Jr. | 180/117 |
| 5,421,538 A * | 6/1995 | Vassa (Suratano Thienphropa) | 244/12.2 |
| 5,429,359 A | 7/1995 | Timperman et al. | |
| 5,467,985 A | 11/1995 | Jones | |
| 5,505,407 A * | 4/1996 | Chiappetta | 244/2 |
| 5,782,431 A * | 7/1998 | Gal-Or et al. | 244/52 |
| 5,941,331 A * | 8/1999 | Gastesi | 180/120 |
| 6,068,537 A * | 5/2000 | Lupton | 446/435 |
| 6,328,304 B1 * | 12/2001 | Lupton | 273/108.1 |
| 6,591,928 B1 * | 7/2003 | Blum | 180/117 |

OTHER PUBLICATIONS

"Finger Trouble" Model Hovercraft, model-hovercraft.com, Nov. 2002.

(Continued)

Primary Examiner—Lesley D. Morris
Assistant Examiner—Marc A. Scharich
(74) Attorney, Agent, or Firm—Hoffmann & Baron, LLP

(57) ABSTRACT

The present invention is an air cushion vehicle and a control mechanism for steering and turning the vehicle. The air cushion vehicle includes a frame having a skirt body extending around the perimeter. An air flow generator may be positioned on the frame for providing a lift flow and thrust flow. At least one vane is disposed on the frame to direct the thrust flow. At least one fin is disposed on the frame downstream of the vane for directing the thrust flow. A turning controller may be used for moving the vane and fin in a coordinating movement to affect the direction or the motion of the air cushion vehicle.

67 Claims, 22 Drawing Sheets

OTHER PUBLICATIONS

"Remote Control Hovercraft," Discovery Channel Store Website, Sep. 2002.
"Hovercraft," www.partner2profit.com, Feb. 2003.
"R/C Tabletop Hockey/Soccar," www.shoplifestyle.com, Sep. 2002.
"Seibun Hovercraft," www.perfectcollectibles.com, Feb. 2003.
"Rotex Hovercraft," Ebay.com Website, Sep. 2002.
"Super Hovercraft," Ebay.com Website, Sep. 2002.
"U.F.O Hovercraft," Ebay.com Website, Sep. 2002.
"Radio Control Navy Hovercraft," Ebay.com Website, Sep. 2002.
AIRBOARD™ www.internationalrobotics.com, Sep. 2002.

* cited by examiner

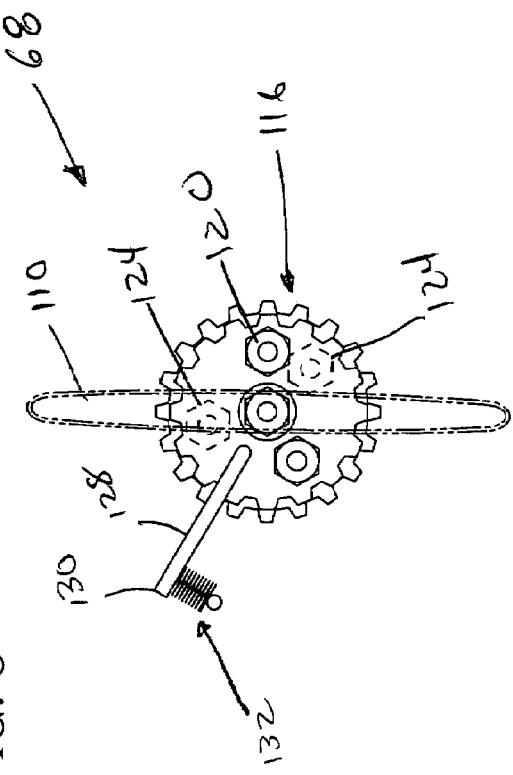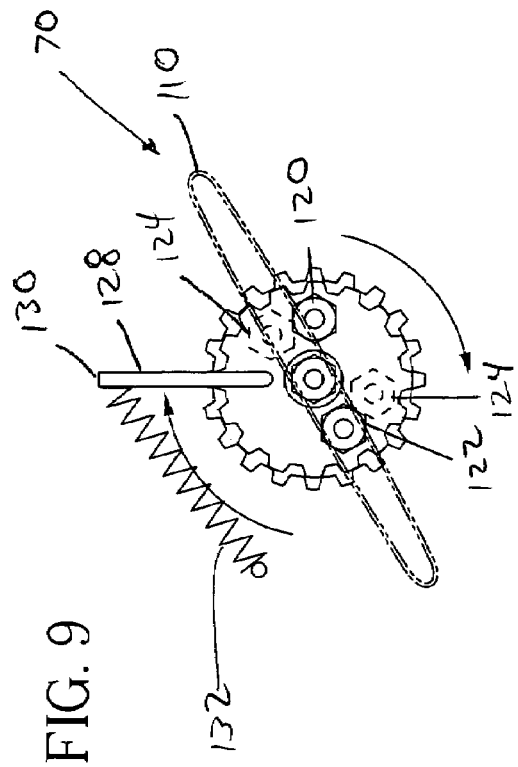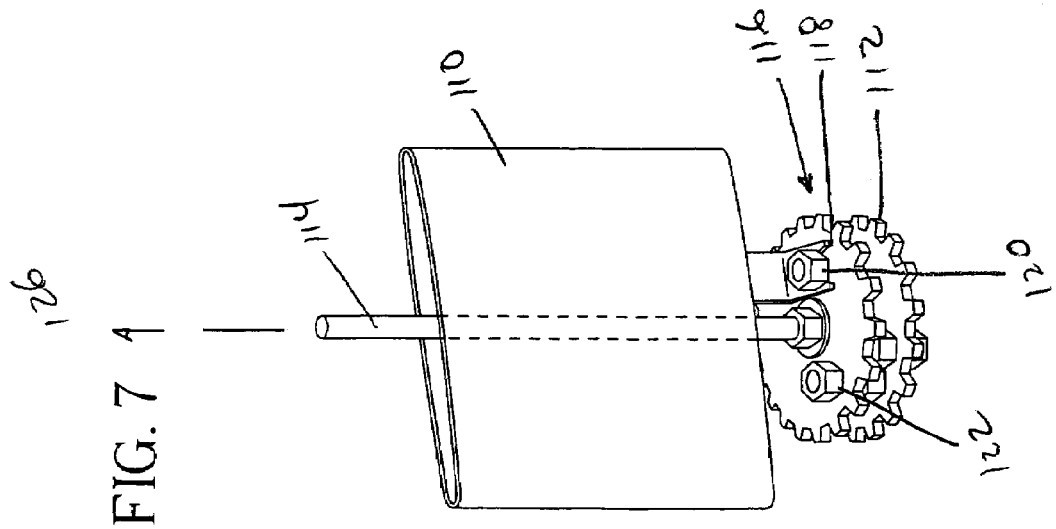

AIR CUSHION VEHICLE AND GAME

BACKGROUND OF THE INVENTION

The present invention relates to an air cushion vehicle and a control mechanism for steering and turning the vehicle. More specifically, the invention relates to an air cushion vehicle having a mechanism for directing the air cushion vehicle to turn accurately and also have a reverse direction.

Air cushion vehicles include ground effect machines or hovercrafts which move by utilizing a cushion of air underneath a lower surface of a support body or frame. The cushion of air supports the body above the ground or a water surface. In general, air cushion vehicles have at least one lifting fan positioned in a support body or frame having a propeller or turbine with an axis of rotation positioned in a substantially vertical direction. The lifting fan blows air in a downward direction underneath the support body to create an air cushion. A skirt body extends down from the support body about its perimeter so that when the lifting fan blows air underneath the support body, the skirt body will trap air underneath the support body so that a cushion of air is created. This cushion of air allows the support body to freely float above the ground or water.

The skirt body is generally a cylindrically shaped tube that extends the entire perimeter of the support body. The skirt body is generally not air tight but is porous to allow the lifting fan to inflate the skirt. U.S. Pat. No. 4,964,835 to Suto discloses an air cushion vehicle that has an inflatable skirt that allows the vehicle to levitate above the ground. A small amount of air is allowed to flow out of the skirt body through vents so that the skirt stays pliable and can conform to the shape of the terrain that the air cushion vehicle travels over. The vents are generally located on a lower portion of the skirt body. However, a problem with prior art skirt body designs is that the lower portion of the skirt body that contacts the ground can become worn and tear over time. Although, the skirt body is typically made of a tough flexible material, it is common that after some use the skirt body lower portion can become worn and have to be replaced.

U.S. Pat. No. 4,964,835 to Suto also shows a hovercraft with at least one thrust fan that is located on the upper surface of the sport body. The thrust fan is used to move the air cushion vehicle in the horizontal plane. The thrust fan is typically mounted so that its propeller or turbine has an axis of rotation positioned substantially in a horizontal direction parallel to the upper surface of the support body and forces air in a generally rearward direction. Prior art thrust fans may be pivotally mounted to rotate right and left to steer and turn the air cushion vehicle. In addition, typically there are a number of fins positioned behind the thrust fan to further direct the thrust air in a desired direction to turn the air cushion vehicle. An alternative prior art design is where the thrust fan is fixedly mounted to the top of the support body and only the fins move right to left to direct the air cushion vehicle.

A problem associated with the prior art design is that the turning of the air cushion vehicle using the prior art designs is not accurate or precise, thus the maneuverability of the vehicle is very poor.

A still further problem with prior designs is that in order for the air cushion vehicle to go backwards in a reverse direction, the thrust fan must turn in an opposite direction than its forward direction. The problem with this particular design is that there are many diesel and gas motors commonly used that cannot reverse their direction thus requiring very expensive and specialized motors. The second way that air cushion vehicles can reverse direction is by changing the angle of attack of the fan blades by pivoting them so that the thrust fan can rotate in the same direction and the direction of the air flow is reversed. However, a problem with this design is that very complex fan blades and fan blade mechanisms are required, thereby increasing costs.

It would be desirable to provide a air cushion vehicle that can turn and pivot accurately with precision and increased maneuverability.

It would also be desirable to provide an air cushion vehicle that has the capability to go in a reverse direction that does not require a complex reverse thrust fan.

It would further be desirable to provide an air cushion vehicle that does not require a complex or expensive tilting/pivoting fan blade to allow the air cushion vehicle to move in a reverse direction.

It would be desirable to provide a skirt body that does not need to be replaced as often due to wear and tear as a prior art skirt body design.

It would be desirable to provide an air cushion vehicle that has the capability to accurately turn in order to play recreational games which is not currently done with hovercrafts since they typically do not have the required maneuverability.

SUMMARY OF THE INVENTION

The present invention is an air cushion vehicle and a control mechanism for steering and turning the air cushion vehicle. The air cushion vehicle includes a frame or support body having a skirt body extending around the perimeter. An air flow generator may be positioned on the frame for providing a lift flow and thrust flow. At least one vane is disposed on the frame to direct the thrust flow. At least one fin is disposed on the frame downstream of the vane for directing the thrust flow. A turning controller may be used for moving the vane and fin in a coordinating movement to affect the direction or the motion of the air cushion vehicle.

In a preferred embodiment, the air flow generator may be a lifting fan positioned in the support body to discharge air in a generally downward direction to lift the support body in a upward direction. A thrust fan supported on the support body may create the thrust flow that travels in a generally first direction rearward. A controller may be used to variably supply power to the lifting fan and the thrust fan.

In a preferred embodiment, a plurality of fins are positioned behind the thrust fan for directing the air cushion vehicle and are selectively positionable between a first open position and a second closed position. A plurality of vanes may be provided between the thrust fan and the plurality of fins, wherein the vanes have a first open position a second angled positioned. The turning controller may be used for selectively actuating the plurality of fins and vanes to work in a coordinated manner. The plurality of fins may be positioned in a curved arc behind the thrust fin to form an array of fins. The array of fins may be divided into equal numbers into a right fin array and a left fin array that are independently actuable. The fins may be pivotally mounted to the support body and are positioned longitudinally in a substantially vertical direction. The first open position of the fins allows the thrust fan air to pass by in a first direction. The second closed position of the plurality of fins deflect the air from the thrust fan in a second direction.

In a preferred embodiment, the plurality of vanes may be pivotally mounted to the support body in a longitudinally and substantial vertical direction behind the thrust fan. The vanes preferably have a first position that allows the air from the thrust fan to pass by the plurality of vanes in a first direction undisturbed. The vanes may also have a second position wherein a flat side of the plurality of vanes are angled away from the first direction to direct the air from the first direction to a second direction towards the plurality of fins. Preferably the second angled positioned of the vanes is angled at 45° from the first direction. The turning controller may be connected to both the plurality of vanes and the plurality of fins to their respective right and left portions and are selectively actuable as desired by the user.

In a more preferred embodiment, the fins in the left and right fin array move in a coordinated motion with each other. Preferably, the fins in the left fin array and right fin array will all turn in equal amount with respect to each other when actuated by the user. The left and right vane array will preferably move in a coordinated movement with the left and right fin array. The left and right vane array will only be actuated from their first position to their second position when the respective left or right fin array moves to its second position. The left and right fin array may be infinitely angled between the first and second position to turn the air cushion vehicle.

A preferred embodiment of the invention further includes an object receiver for selectively receiving and ejecting a playing object into the support body. The object receiver may have a curved surface positioned on the outer perimeter of the support body to accept a playing object. A selectively actuable ejector may be positioned in the support body for selectively ejecting the playing object out of the object receiver. The ejector may be an air actuated solenoid having an ejection post that is selectively actuable between a first closed position and a second open position wherein the second open position forcably ejects the playing object from the object receiver. Preferably there are at least two air actuated solenoids having ejection posts oppositely positioned within the object receiver.

In a preferred embodiment of the invention, the skirt body may have a substantially cylindrical cross section with an upper portion extending around the outer perimeter of the support body and a lower portion extending downwardly. At least one vent may be positioned on the lower portion of the skirt body allowing air to escape in a downward direction. A skirt extension extending from the lower portion of the skirt body may be positioned adjacent at least one vent for spacing the skirt body a predetermined distance above the ground. In a preferred embodiment, the skirt body may further include a removable substantially flat member on the lower portion of said skirt body to form a substantially flat bottom surface.

In a preferred embodiment of the invention, a fin array position indicator may be provided which moves in a coordinated movement with the fins. The fin array position indicator may be connected to the right and/or left fin array to indicate the position of the right and/or left fin array. Preferably, the fin array position indicator includes a left fin array indicator and a right fin array indicator.

In a more preferred embodiment of the present invention, the support body may include at least a plurality of selectively actuated support wheels attached to a bottom surface. The support wheels may have an extended position for allowing the support body to be supported above the ground by the support wheels. A second retracted position of the support wheels may be provided for allowing the support body to be lifted above the ground by only the lifting fan. The support wheels may include a cylinder attached to the bottom surface of the support body and a selectively actuable piston slideably positioned in the cylinder for moving the support wheel into a retracted and an extended position. The wheel may be attached to the lower surface of the piston and may be mounted to swivel about a vertical axis. Preferably, the support wheel is mechanically actuated by the user using a threaded rod attached to the piston. In an alternative embodiment, the support wheel may be actuated by a pneumatic cylinder attached to the piston.

In an alternative embodiment of the present invention, the support body may have at least one hinged portion. The hinged portion allows the support body to fold upon itself to facilitate storage of the air cushion vehicle. In a more preferred embodiment, the support body has two parallel hinge portions that divide the support body into thirds so that the support body may be folded into a substantially u-shaped for ease of storage and movement.

In a preferred embodiment, the turning controller may include a user control device selectively activated by the user to steer or direct the air cushion vehicle. A first fin may be rotatably mounted to the support body by a first fin shaft. The first fin may be operatively connected to the user control device. A first vane may be rotatably mounted to the support body by a first vane shaft and operatively connected to the first fin wherein when the user control device is activated, the first fin actuates the first vane. The turning controller may further include at least one second fin rotatably mounted to the support body by a second fin shaft positioned adjacent and operatively connected to the first fin to move in a coordinated movement. The first fin may be mechanically linked to the at least one second fin using a chain. In an alternative embodiment, the first and second fin are actuated using individual solenoids to move the fins in a coordinated manner.

The turning controller may also include a second vane rotatably mounted to the support body by a second vane shaft attached adjacent the first vane and operatively connected to the first vane to move in a coordinated movement with the first vane. The first vane may be mechanically linked to second vane using a chain. It is also envisioned that the first vane and second vane may be actuated using individual solenoids.

In a preferred embodiment, the turning controller may further include a first drive sprocket attached the first fin shaft. The first drive sprocket may be mechanically linked to the user control device wherein the activation of the user control device rotates the first fin by the first drive sprocket. A first rotating sprocket may be attached to the second fin shaft wherein the first rotating sprocket is mechanically linked to the first drive sprocket and the rotation of the first fin causes a coordinated movement of the second fin. The turning controller may also include a clutch mechanism attached to the first vane shaft. The clutch mechanism is operatively connected to the chain wherein rotation of the first fin actuates the clutch mechanism from an engaged or disengaged position. The engaged position allows a coordinated rotation of the first vane and the first fin. The disengaged position of the clutch mechanism allows for rotation of the first fin without rotating the first vane. A third rotating sprocket may be attached to a second vane shaft. The second rotating sprocket is operatively connected to the third rotating sprocket to allow for coordinated movement of the second vane when the first vane is rotated. The sprockets may be operatively connected using a second chain.

A method of playing a game using an air cushion vehicle of the present invention is also contemplated. A first goal area may be provided with an oppositely positioned second goal area on a playing field with a freely movable playing object. A first air cushion vehicle may be used with a playing object receiving means and ejection means to receive the freely movable playing object in the receiving means. The first air cushion vehicle may eject the playing object from the object receiver towards the first goal area. A second air cushion vehicle with a playing object receiver and ejector may be used to prevent the playing object from entering the first goal area. Play may be continued until a desired number of goals are obtained by either the first or second air cushion vehicle.

For a better understanding of the present invention, reference is made to the following description to be taken in conjunction with the accompanying drawings and its scope will be pointed out in the appended claims.

BRIEF DESCRIPTION OF THE DRAWINGS

FIG. 7 is a top perspective view of a clutch mechanism attached to a shaft of a vane;

FIG. 8 is a top plan view of the first vane in a first position;

FIG. 9 is a top plan view of the first vane in a second position;

DETAILED DESCRIPTION OF THE PREFERRED EMBODIMENTS

Figure 1:
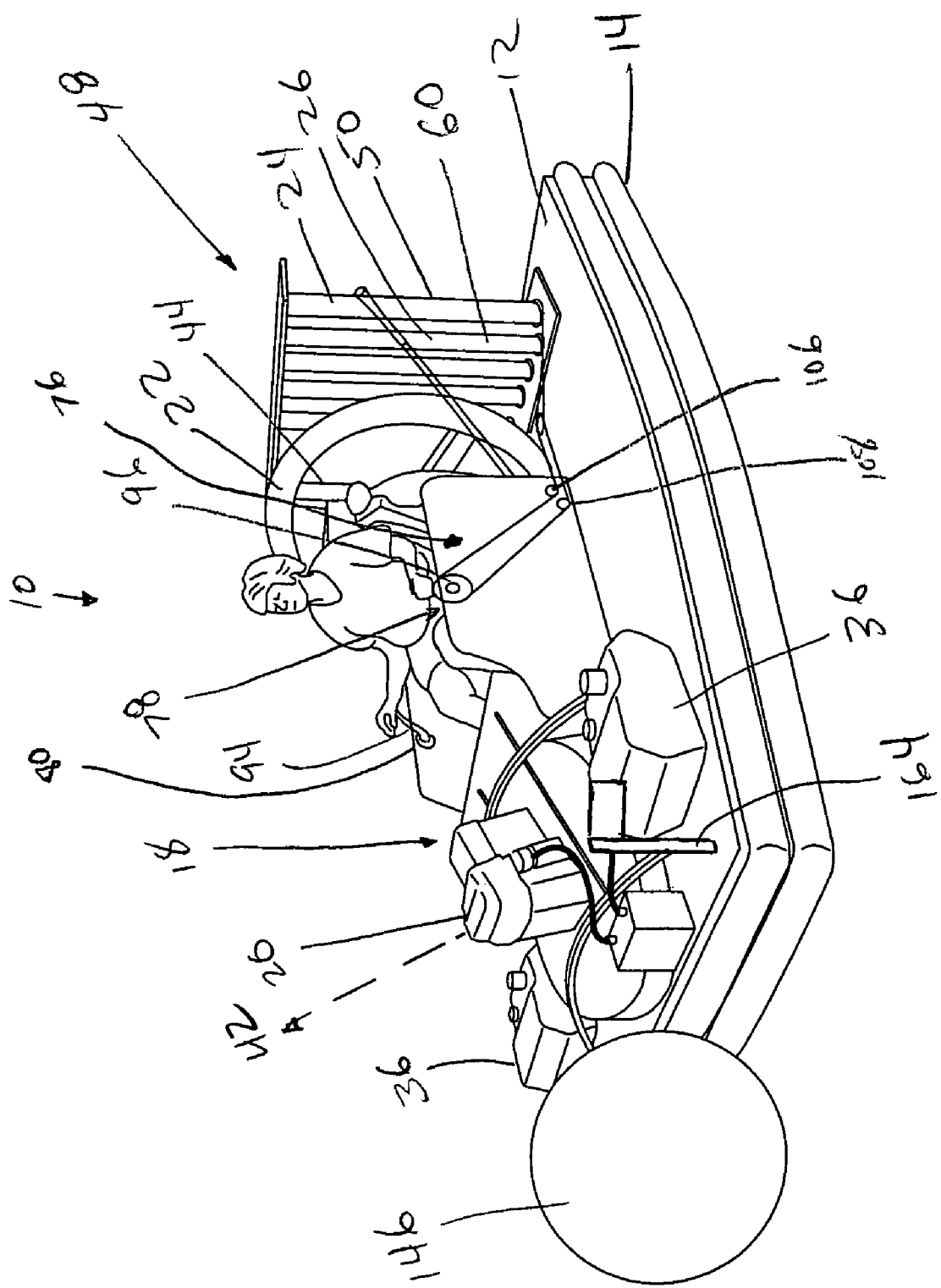
FIG. 1 is a top perspective view of an air cushion vehicle of the present invention.

An air cushion vehicle 10 of the present invention is shown in FIG. 1. It is contemplated that the air cushion vehicle 10 of the present invention may be used as a personal transport device for a person or in the alternative may be remote controlled. The air cushion vehicle 10 can be of any scale from the size of a toy remote control hovercraft to a personally driven hovercraft. The air cushioned vehicle 10 of the present invention includes a support body 12 or frame having a skirt body 14 extending downwardly around the outer perimeter 16. An air flow generator 18 including a lifting fan 20 may be positioned within the support body to discharge air in a generally downward direction to lift the support body 12 in an upward direction. The lifting fan 20 may be positioned substantially in the center of the support body 12 to evenly support the air cushion vehicle 10. The air flow generator 18 may also include a thrust fan 22 supported on the support body 12 directing thrust fan air in a first direction 66 generally horizontal to the ground to create a thrust flow directed in a rearward direction. The lifting fan 20 and thrust fan 22 may be actuated using a controller 38 that supplies variable amounts of power to both the lifting fan 20 and thrust fan 22. The air cushion vehicle 10 may be directed using at least one fin 24 or more to form a fin array 50 positioned behind the thrust fan 22 for directing the thrust flow. The air cushion vehicle 10 may also include at least one vane 26 or more to form a vane array 60 positioned between the thrust fan 22 and the fin array 50 to direct the air from the thrust fan 22 into the fin array 50. Both the fins 24 and the vanes 26 may be controlled using a turning controller 48 selectively actuated by the user.

Figure 10:
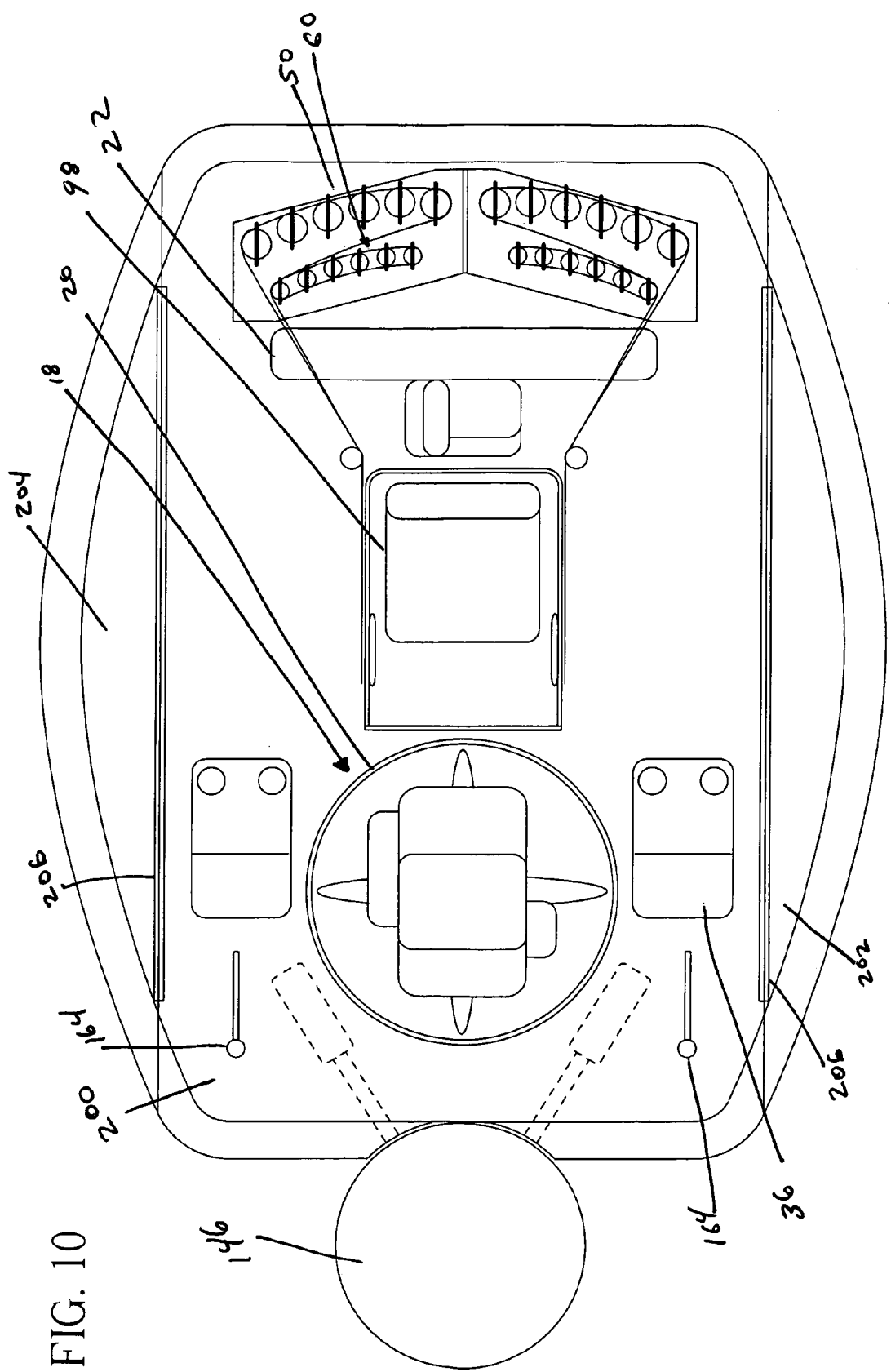
FIG. 10 is a top plan view of an alternative embodiment of the air cushion vehicle of the present invention.
Figure 11:
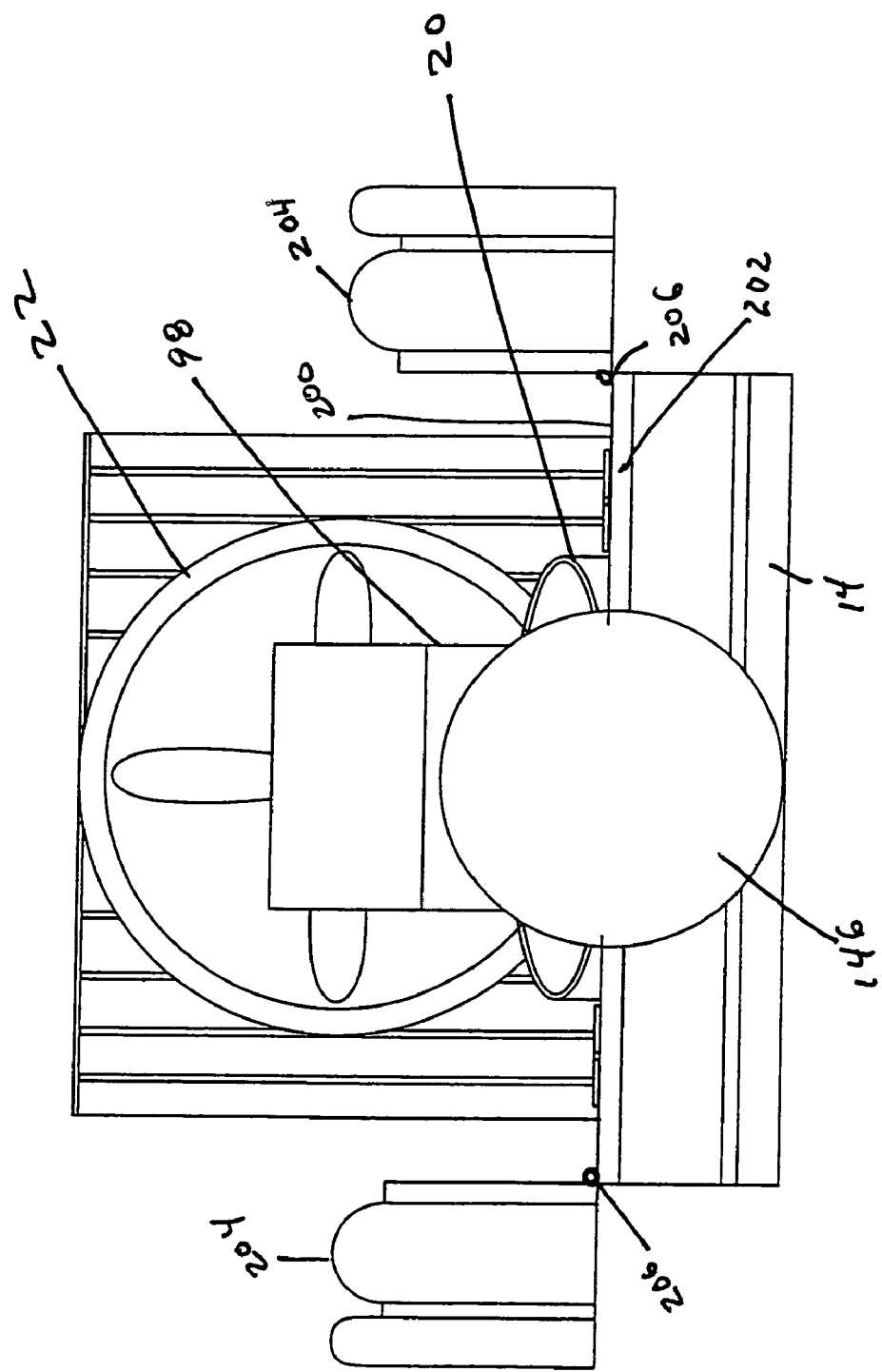
FIG. 11 is a front elevational view of the air cushion vehicle shown in FIG. 10 with the support body in a folded position.

Referring generally to FIGS. 1-6, a support body 12 forms a frame upon which the various components are secured. The support body 12 may be made of any rigid material as desired. In alternative embodiment as shown in FIGS. 10 and 11, an air cushion vehicle 200 may have a support body 202 having side portions 204 that are hingedly attached using hinges 206. As shown in FIG. l1the side portions 204 may be folded into a substantially vertical position to allow for compact storage of the air cushion vehicle 200 when not in use. Referring back to FIG. 1, the support body 12 has an outer perimeter 16 from which has a skirt body 14 extends downwardly. The skirt body 14 may have a generally circular configuration and resembles a tube in cross section. Different shapes and configurations of the skirt body 14 may be used as known in the art.

Figure 2:
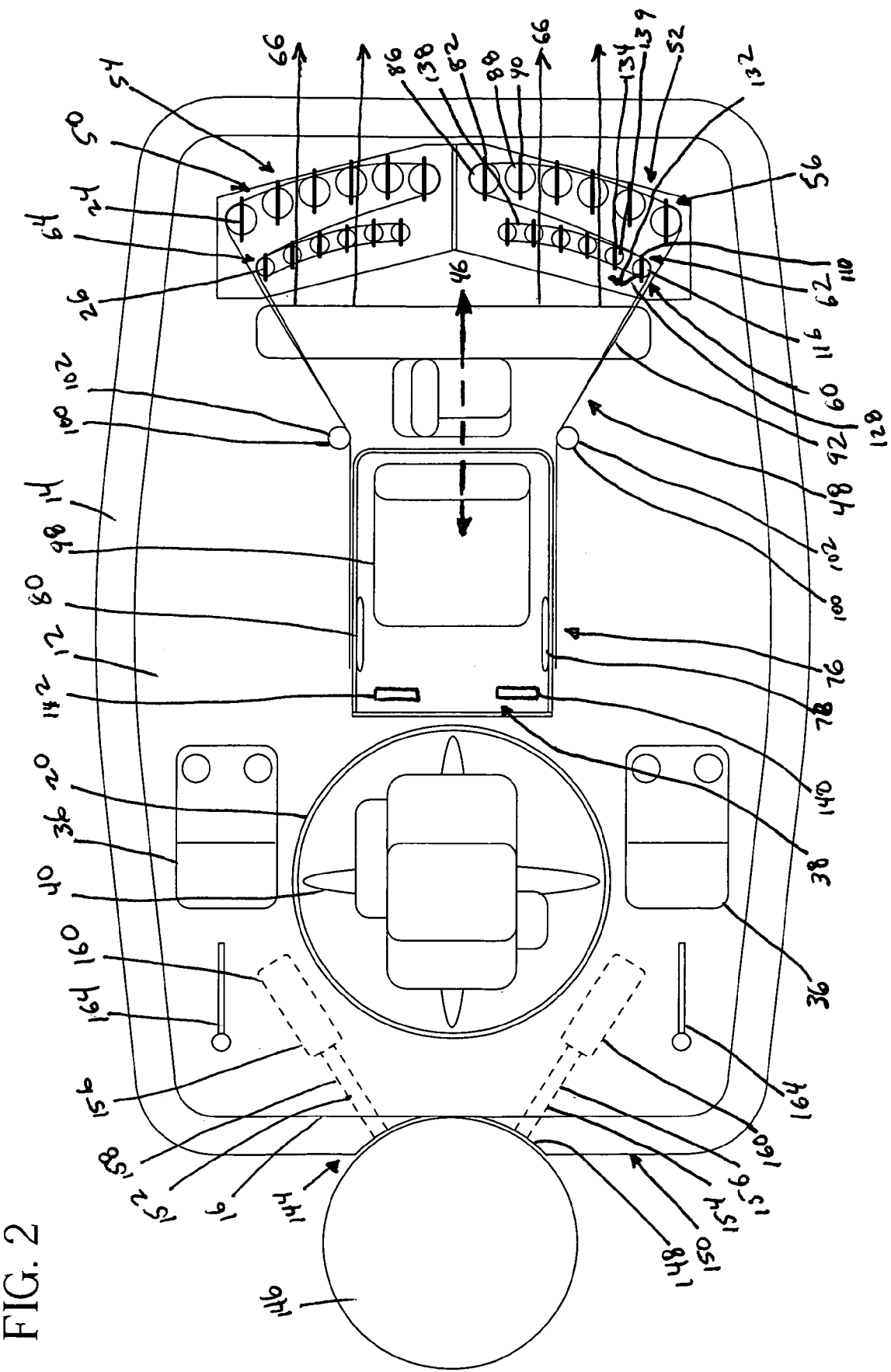
FIG. 2 is a top plan view of the present invention showing a fin and vane array in a first position.
Figure 16:
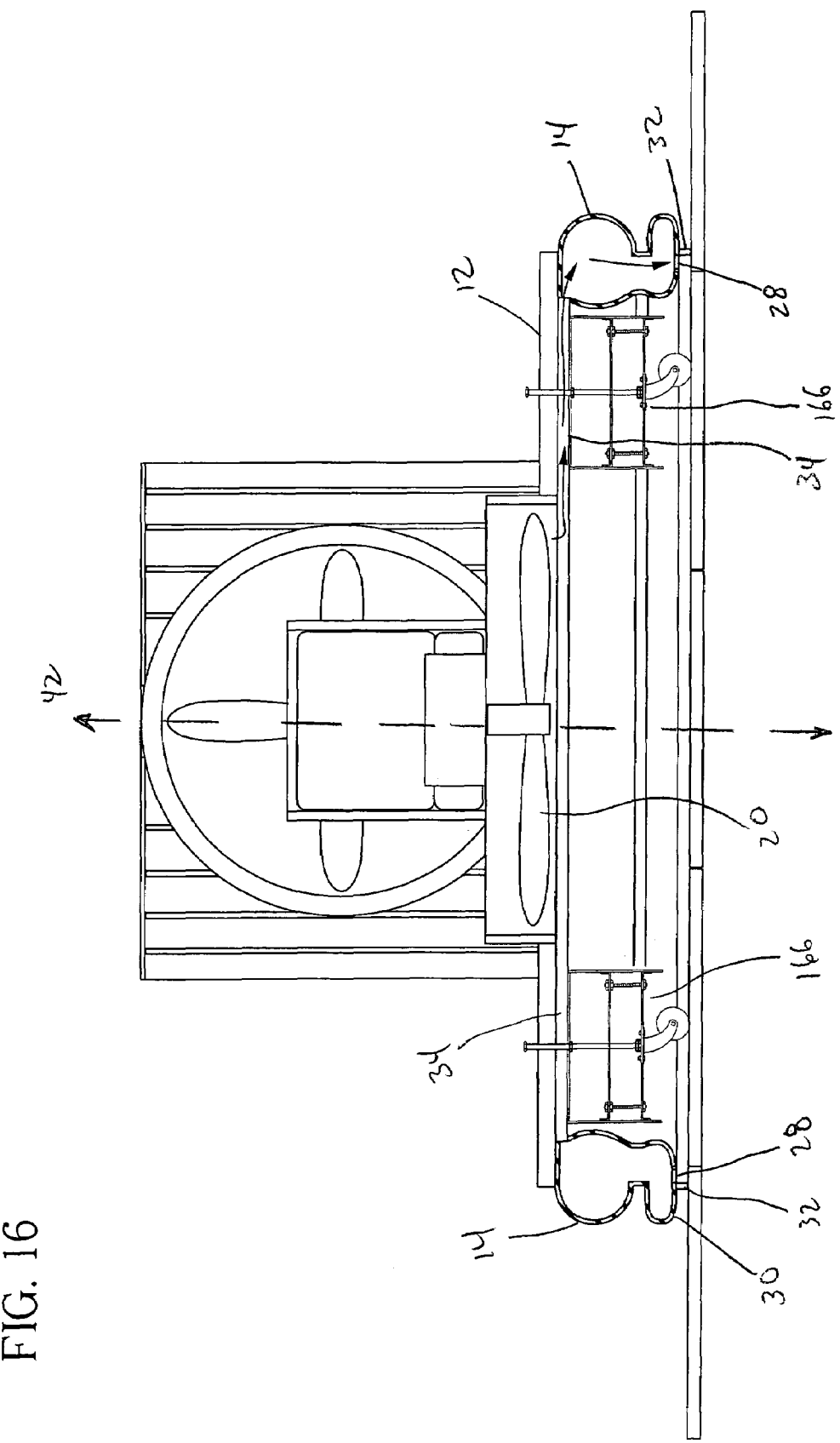
FIG. 16 is a cross-sectional view of the skirt of the present invention showing a skirt extension.
Figure 17:
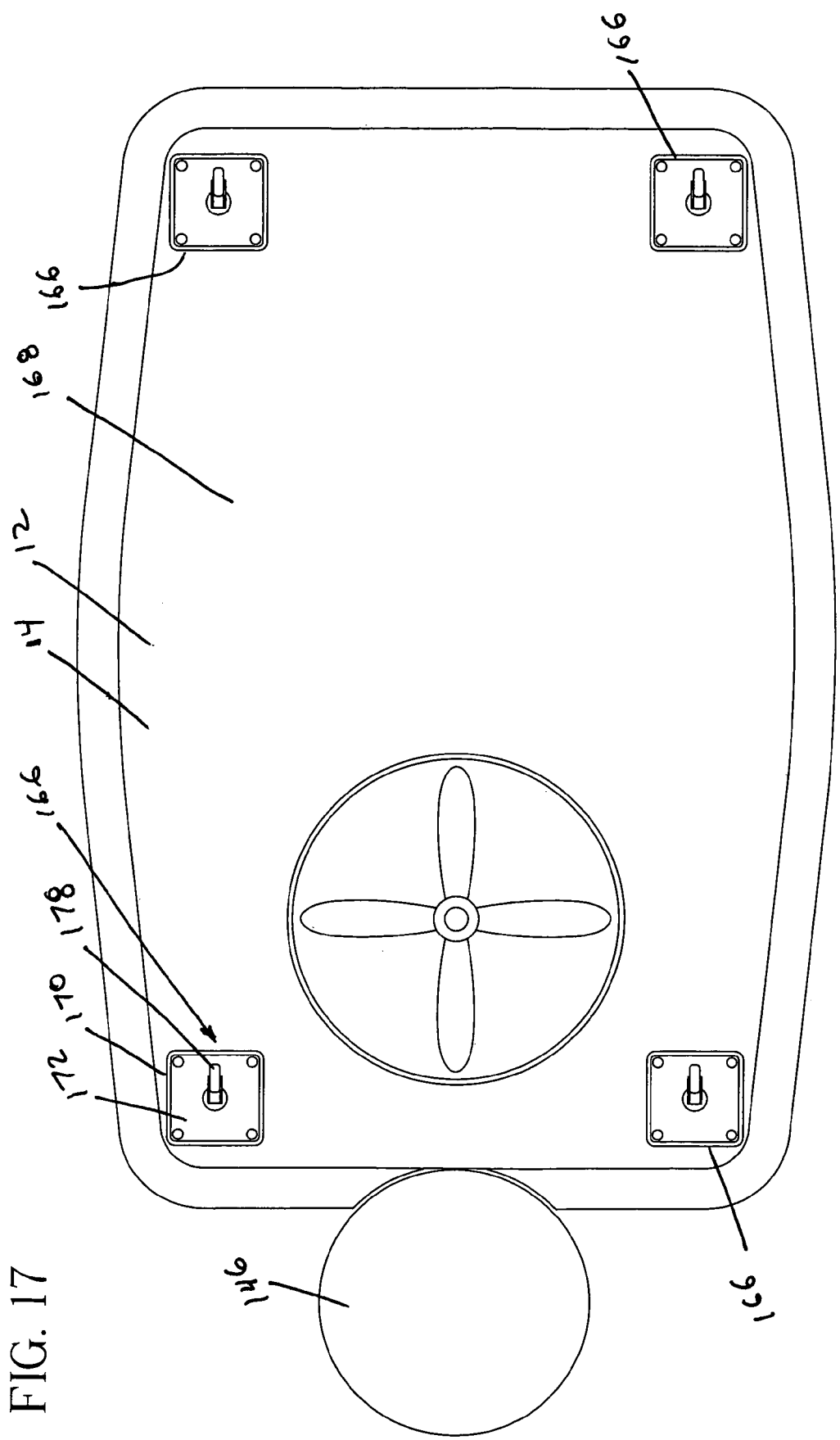
FIG. 17 is a bottom plan view of the air cushion vehicle shown in FIG. 1.

Referring to FIGS. 1, 2, and 16, in a preferred embodiment, the skirt body 14 may have a plurality of vents 28 on a lower portion 30 thereof. The skirt body 14 may have air from the lifting fan 20 directed into the skirt body 14 by air ducts 34. An advantage to this particular design is the vents 28 (FIG. 16) on the bottom of the skirt body 14 allow the skirt body 14 to be inflated to the desired rigidity without the fear of overinflation. The skirt body 14 also provides cushioning for the air cushion vehicle when traveling over uneven surfaces. The skirt body 14 may further include a skirt extension 32 (FIG. 16) extending downwardly from a lower portion 30. The skirt extension 32 extends the entire length of the skirt body 14. The skirt extension 32 may be made of semi-rigid or flexible rubber. The skirt extension 32 protects the skirt from the ground so that the skirt body 14 itself will not travel on the ground to prevent the skirt body from being prematurely worn or punctured by the uneven surfaces that the air cushioned vehicle 10 may travel over.

In an alternative embodiment (not shown), the skirt body 114 can further include a substantially flat sheet like member on the lower portion 30. The skirt will have a substantially flat lower surface to smoothly travel over smooth water surfaces.

The air cushion that the air cushion vehicle 10 rides upon may be generated by the lifting fan 20. The lifting fan 20 may be an electric, gas, diesel or any other type of motor known in the art. For exemplary purposes, the lifting fan 20 of the present invention is a gas powered motor using fuel that is supplied from tanks 36 on the support body 12. The lifting fan 20 may be positioned on the support body 12 to discharge air in a generally downward direction through the support body 12 through a first aperture 21. The lifting fan 20 is of a sufficient power to direct air in a downward direction to lift the support body 12 off of the ground. The lifting fan 20 is also selectively actuable by the user using a controller 38 to supply power at a variable level. The controller 38 allows the user to vary the amount of power provided to the lifting fan 20 to either increase or decrease the height of the support body 12 from the ground. A user may wish to lift the support body 12 a greater distance off the ground when traveling over uneven surfaces and closer to the ground when traveling over very smooth surfaces. The lifting fan 20 creates the cushion of air underneath the support body that is trapped by the skirt body 14 around the support body 12 to allow the air cushion vehicle 10 to move. As shown in FIG. 1, the lifting fan 20 is shown to have four fan blades 40 however, any number of fan blades 40 may be used as desired. In a preferred embodiment, the lifting fan 20 is positioned so that the axis of rotation 42 of the fan blades 40 is substantially vertical. In an alternative embodiment (not shown), the lifting fan 20 may have turbine blades or any other blade design to create a discharge of air in a downward direction.

The horizontal movement of the air cushion vehicle 10 may be provided by the thrust fan 22. The thrust fan 22 may be of similar construction to the lifting fan 20, however, it may be positioned so that the axis of rotation 46 of its fan blades 44 is in a horizontal plane generally parallel to the top surface of the support body 12. A turning controller 48 may be used to direct the thrust flow in a desired direction to turn the air cushion vehicle 10. The turning controller 48 may include a plurality of fins 24 to form a fin array 50 positioned behind the thrust fan 22 for directing the air cushion vehicle 10, and more preferably a plurality of vanes 26 to form a vane array 60 positioned between the thrust fan 22 and the fin array 50 to further direct the thrust flow. The user actuated turning controller 48 may selectively actuate both the fin array 50 and the vane array 60 so that they move in a coordinated manner to change the direction of movement of the air cushion vehicle 10.

Figure 19:
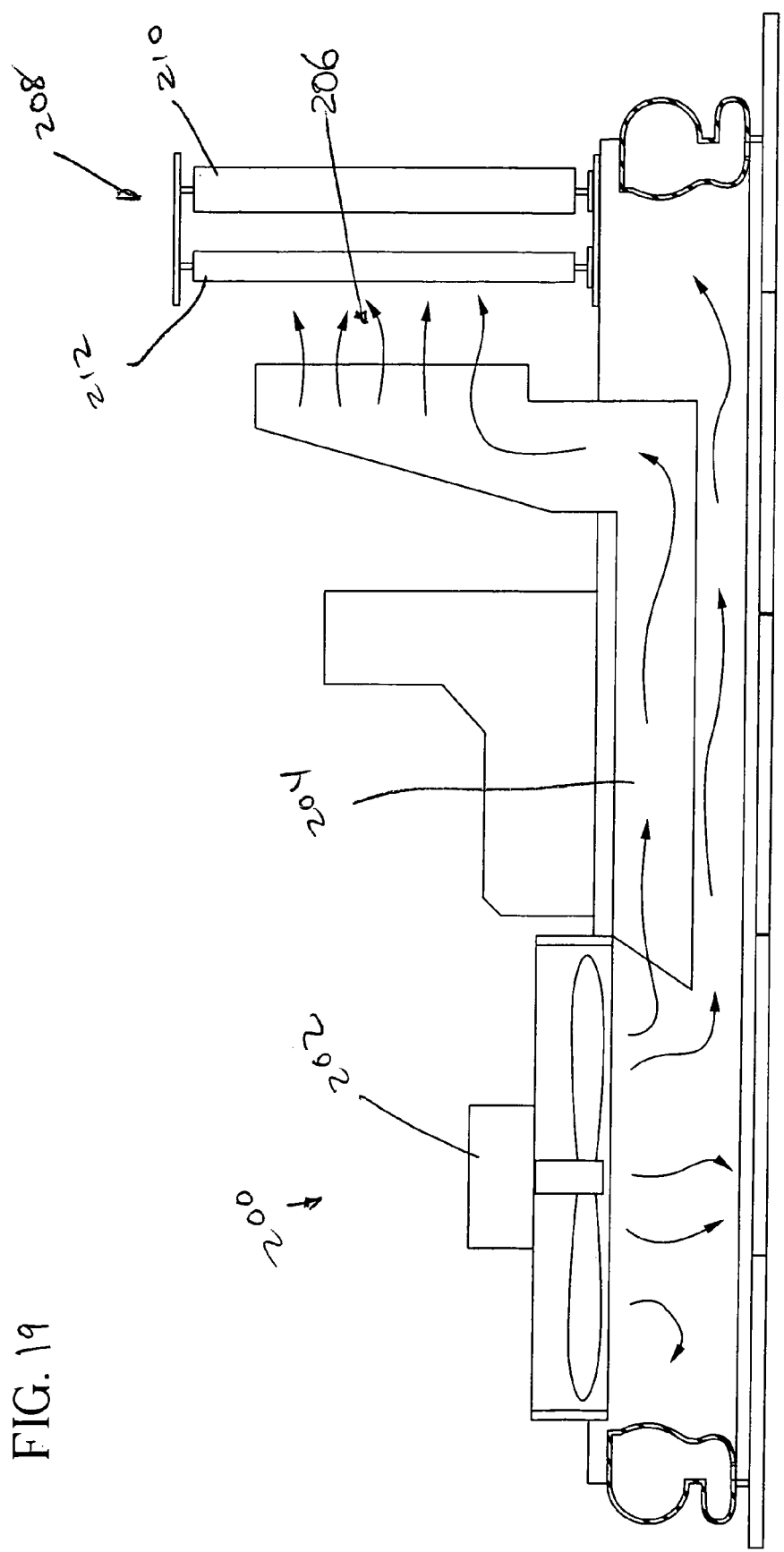
FIG. 19 is a cross-sectional view of an alternative embodiment of the air cushion vehicle of the present invention.

An alternative embodiment of the air cushion vehicle 200 as shown in FIG. 19. A single air flow generator such as a fan or turbine may provide both the for the air cushion vehicle 200. A single fan 202 may be positioned to direct air in a generally downward direction to provide lift. A plenum or air duct 204 may be connected to the single fan 202 to direct a portion of the air directed in a downward direction to a first horizontal direction 206. The air exiting the air duct 204 may then be directed using the turning controller 208 of the present invention to control the horizontal movement of the air cushion vehicle 200. The turning controller 208 can have a fin array 210 and a vane array 212 positioned behind the air duct 204. The turning controller 208 can be constructed in a similar manner as the first embodiment shown in FIG. 2 that is described in detail below.

Referring back to FIG. 2, in a preferred embodiment, at least one fin 24, and more preferably a plurality of fins 24 are arranged in a generally semi-circular arc configuration downstream from the thrust fan 22 to create a fin array 50. The fin array 50 is used to direct the thrust flow from the thrust fan 22 away from the first direction 66 to change the movement of the air cushion vehicle 10 in the horizontal plane. Preferably, the fins 24 are positioned in a substantially vertical direction and may be pivotally connected to the support body 12. Fin array 50 may be have a left fin array 52 and a right fin array 54. The left 52 and right 54 fin array preferably have equal numbers of fins 24. The left 52 and right 54 fin arrays are selectively actuable by the user independently from each other. The actuation of the left fin array 52 will be described in detail with the right fin array 54 being identical in construction and function.

The left fin array 52 may have a plurality of fins 24 pivotally positioned vertically on the support body 12 behind the thrust fan 22. The fins 24 rotate in a coordinated movement by the turning controller 48, meaning the fins 24 all pivot at the same time. In a preferred embodiment, the fins 24 in the left fin array 52 will rotate identically the same amount. The left fin array 52 has a first open position 56 (FIG. 2) to allow the thrust flow to pass by the left fin array 52 without disturbance. The fins 24 may have a substantially flat rectangular profile with the longitudinal dimension positioned substantially vertical.

The fins 24 and fin array 50 may be selectively variably actuable between the first open position 56 and a second closed position 58 (FIG. 4) where the flat side of the fins 24 are positioned substantially perpendicular to the first direction 66 of thrust flow from the thrust fan 22 to deflect the thrust flow in the second direction 72. The user may change the angle of the fins 24 from the first open position 56 to angle the air from the thrust fan 22 to turn the air cushion vehicle either quickly or slowly. As the fins 24 are angled closer to the second position 58, the air cushion vehicle 10 will make sharper turns.

The second closed position 58 is used when the user wishes to direct the thrust fan airflow in a generally forward direction to cause the air cushion vehicle 10 to travel in a reverse direction. However, it has been found that when the fin array 50 is in the second closed position 58, that the air is directed directly back into the thrust fan 22 which does not create the desired result. In order to alleviate this problem, a plurality of vanes 26 may be positioned downstream of the thrust fan 22 and upstream of the fin array 50. The vanes 26 are used to direct the air exiting the thrust fan 22 in an angled direction away from the first direction 66 so that the air is directed to follow the curved wall 74 created by the closed position of the fin array 50 in the second closed position 58. The vane array 60 preferably moves in a coordinated movement with the fin array 50. In a more preferred embodiment, a portion of the vane array 60 may only direct the air away from the first direction 66 when a portion of the fin array 50 is in the second closed position 58.

The air cushion vehicle 10 may include a plurality of vanes 26 to form a vane array 60 that is divided into right vane array 64 and left vane array 62. The right 64 and left 62 vane arrays preferably have equal numbers of vanes, and the left 62 and right 64 vane arrays are independently actuated by the user. Preferably, the vanes 26 are rectangular in profile and pivotally mounted to the support body and positioned longitudinally in a substantially vertical direction. The vanes 26 may have a first position 68 (FIG. 2) which allows the thrust flow from the thrust fan 22 to pass without being disturbed in the first direction 66. The vane array 60 may also have a second position 70 (FIG. 4) wherein the flat side of the vanes 26 are angled away from the first direction 66 to direct the thrust flow away from the first direction 66 to a second direction 72. The left vane array 62 will be described in detail with the right vane array 64 being identical in construction.

Figure 4:
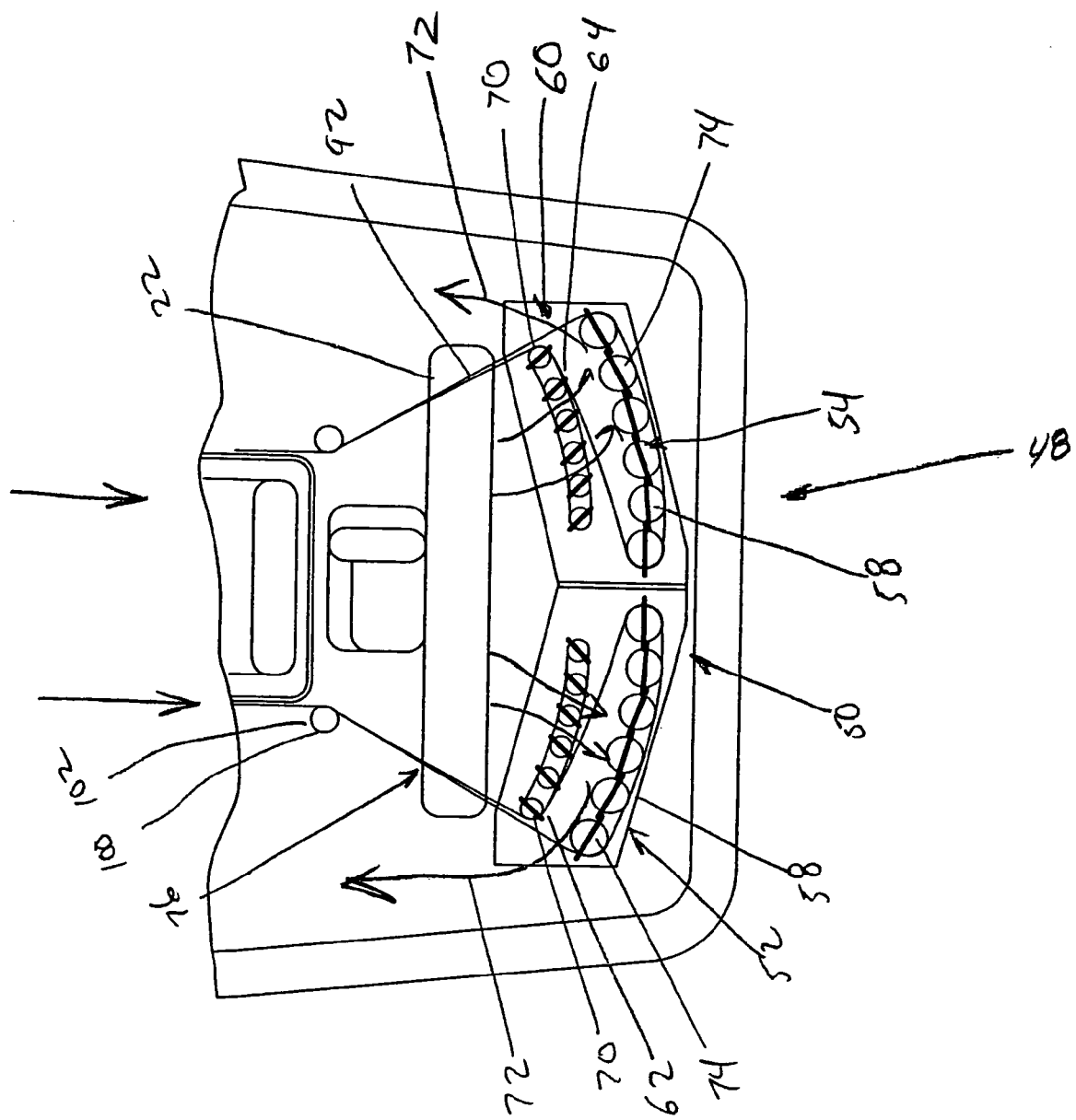
FIG. 4 is a top plan view of the left and right fin array in a second position and left and right vane array in a second position.

The left vane array 62 has a plurality of vanes 26 positioned adjacent one another and are operatively connected to move in a coordinated manner. The movement of the left vane array 62 will preferably have the individual vanes 26 pivot in an identical manner in parallel relation to each other as desired by the user. In a preferred embodiment, the left vane array 62 will stay in the first position 68 whenever the left fin array 52 is either in its first position 56 or variably positioned between the first position 56 and second closed position 58. More preferably, the left vane array 62 may not move from the first position 68 until the left fin array 52 is positioned in its second closed position 58. When the left fin array 52 is in its second closed position 58 the left vane array 62 will move to its second position 70. In a preferred embodiment, the second position has the vanes on the left vane array angled at approximately 45° from the first direction 66 of the thrust flow. An advantage to the left vane array 62 being positioned in the second position 70 is that the thrust flow is directed away from the first direction 66 and toward the closed left fin array 52. The air then travels along the closed left fin array 52 in a forward direction towards the front of the air cushioned vehicle 10. As shown in FIG. 4, the left vane array 62 and the left fin array 52 when used in conjunction with each other allows the thrust flow to be directed in a reverse direction without having to reverse the direction of the thrust fan 22 motor or the fan blades.

The fin array 50 and vane array 60 positions described above may be used to move and direct the air cushion vehicle 10 in various ways. Specific movements of the air cushion vehicle 10 are hereinafter described referring to FIGS. 2-6 and 22-23. The movements described are only for exemplary purposes and many other movements and directions may be effected utilizing the fin array 50 and the vane array 60.

The fin array 50 and the vane array 60 may be used to direct the thrust flow from the thrust fan 22 in a first direction 66 generally rearwardly to move the air cushion vehicle 10 forward. Referring to FIG. 2, the forward movement of the air cushioned vehicle 10 is accomplished by placing the fin array 50 and the vane array 60 in their respective first positions to allow the air cushion vehicle 10 to travel in a forward direction. The fin array 50 and vane array 60 are arranged such the thrust flow from the thrust fan 22 is not disturbed and travels in a first direction 66 generally rearward downstream from the thrust fan 22.

Figure 3:
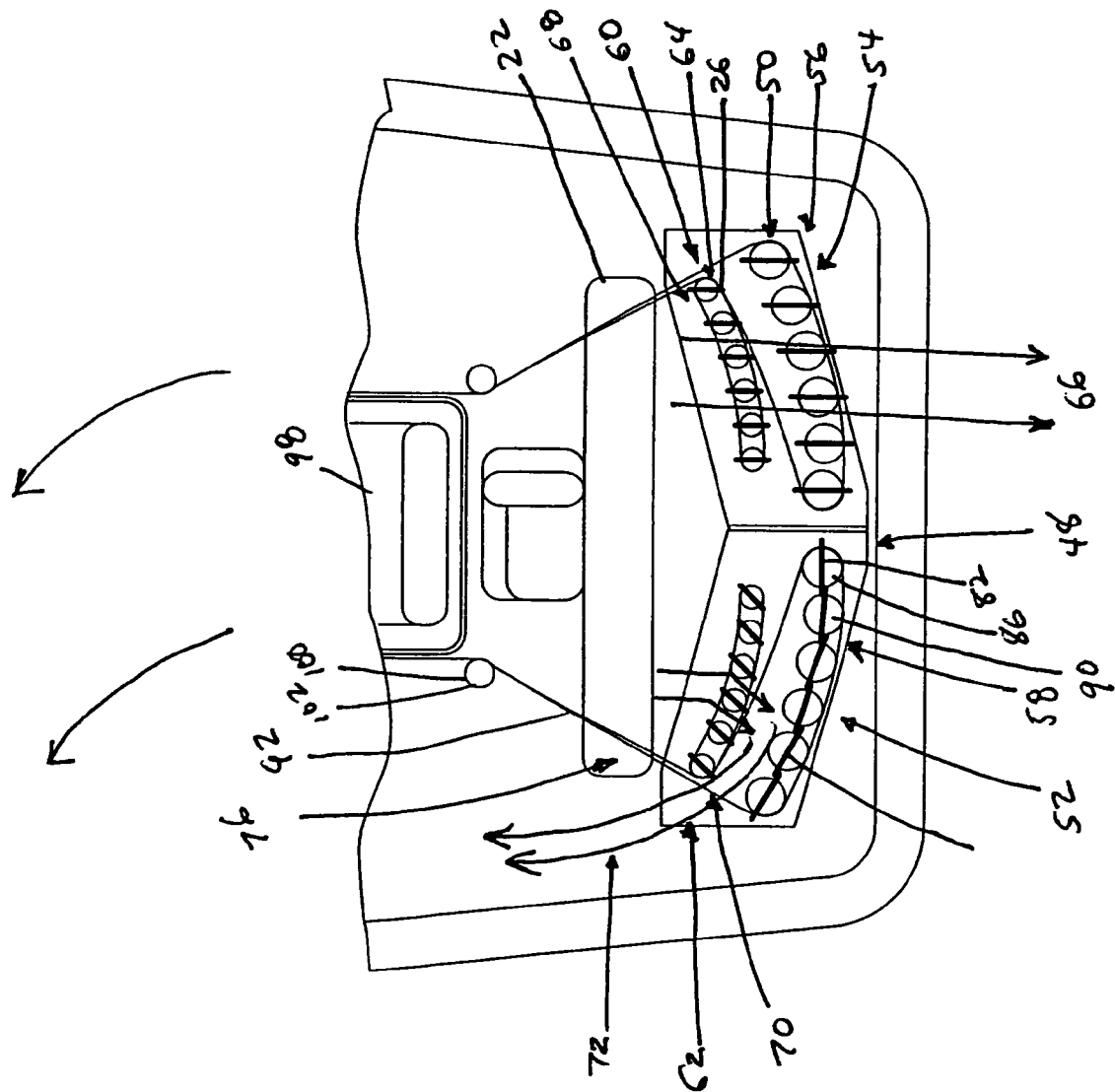
FIG. 3 is a top plan view of the left fin array in a second position and the left vane array in a second position.

Referring to FIG. 3, the turning controller 48 may be positioned to turn and/or pivot the air cushion vehicle 10 quickly to the right or the left, while at the same time allowing for a small turning radius. The arrangement of the fin 50 and vane array 60 is shown for pivoting the air cushion vehicle 10 to the left for exemplary purposes. The left vane array 62 is positioned in its second position 70 to direct the thrust fan air away from the first direction 66 and instead directs the air to contact the left fin array 52 in an angled position. The left fin array 52 is in the second closed position 58 to form a substantially flat surface so that the air from the thrust fan 22 is directed in a direction approximately 180° from the original thrust flow direction 66. At the same time the thrust flow from exiting the thrust fan 22 that contacts the right fin array 54 will continue to travel in the first direction 66. The thrust flow is now directed in both a forward direction and a backward direction to cause the air cushion vehicle 10 to pivot in a counter clockwise direction to the left. An advantage to this design is that the air cushion vehicle 10 may turn at a faster rate than simply redirecting the air from side to side as in the prior art devices.

Referring to FIG. 4, the turning controller 48 of the present invention allows a user to move the air cushion vehicle 10 in a reverse direction. The act of moving the air cushion vehicle 10 in reverse does not require the changing the angle of the thrust fan blades 44 or the rotation of the thrust fan blades 44 as required in the prior art. The reverse direction is accomplished by positioning the both the right 54 and left 52 fin arrays in the second position 58 to form a substantially flat curved wall 74 behind the thrust fan 22. The left 62 and right 64 vane arrays are also positioned in their second position 70 to direct the thrust flow away from the first direction 66 and angle the thrust flow before reaching the fin array 50. The thrust flow after leaving the vane array 60 is directed to follow the curve of the arc created by the closed fins 24. The air leaving the fin array 50 travels in a substantially forward direction to push the air cushion vehicle 10 backwards.

Figure 5:
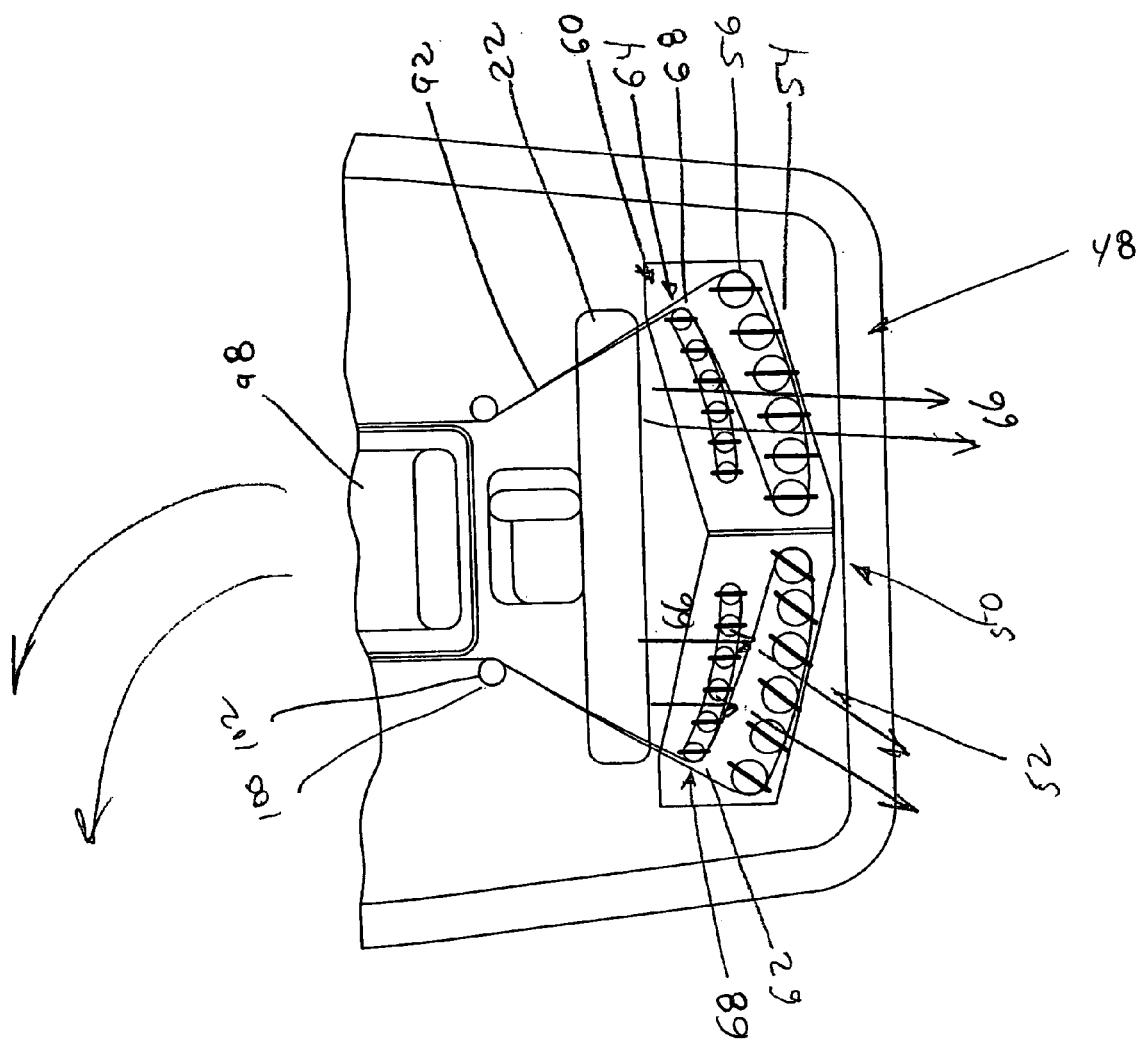
FIG. 5 is a top plan view of the left fin array in angled position and the left vane array in a first position.

Referring to FIG. 5, the turning controller 48 may be positioned to slowly turn the air cushion vehicle 10 when a larger turning radius is needed to avoid obstacles. In some instances a user may not wish to pivot the air cushion vehicle 10 quickly as shown in FIG. 3, but instead make large sweeping turns. For exemplary purposes a left turn is described in detail. The left turn is accomplished by positioning the left fin array 52 in a variable position between the first 56 and second 58 positions. The left vane array 60 stays in its first position 68 to allow the thrust flow to travel in the first direction 66 toward the left fin array 52. The user may selectively actuate the fin array 60 to angle the thrust fan air in a direction away from the first direction 66 to turn the vehicle to the left. The left fin array 52 is shown to be at a 45° angle, however, any angle may be chosen. If the user wishes to decrease the left turning radius and make the air cushion vehicle 10 turn sharply to the left, then the left fin array 52 may be selectively actuated to direct the air at an angle greater than 45° from the first direction 66. The right fin array 54 and right vane array 64 stay in their respective first positions to allow the thrust flow to travel in the first direction 66. The air cushion vehicle 10 will turn to the left since the left fin array 52 is directing a portion of the thrust force to the left.

Figure 6:
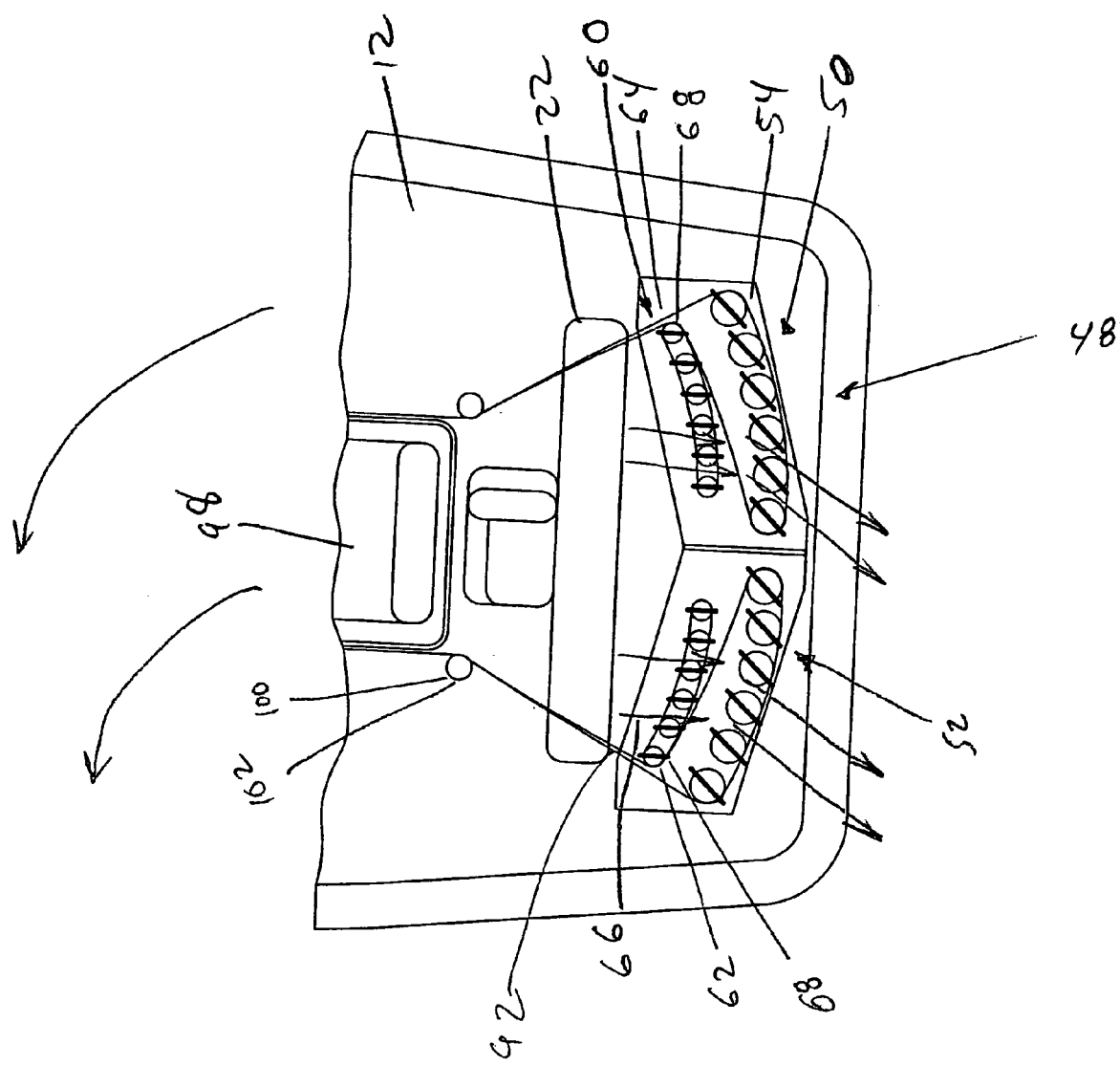
FIG. 6 is a top plan view of the left and right fin array in an angled position.

Referring to FIG. 6, the air cushion vehicle 10 may be directed to move in long radius turn to the left or right. An advantage to this particular movement is that the user may make long sweeping turns with a very long turning radius. The turning of the air cushion vehicle 10 is accomplished by the turning controller 48 positioning both the right fin array 54 and left fin array 52 so that they are angled in the same direction. The left 62 and right 64 vane array are in their first position 68 to allow the thrust flow to travel in the first direction 66 toward the fin array 50 without being disturbed. The thrust flow going to the left 52 and right fin 54 array will be directed in a generally left rearward direction to cause the air cushion vehicle 10 to make a long radius turn slowly to the left. In order to make the air cushion vehicle 10 turn to the left, the angle of the fin array 50 need only be reversed.

Figure 22:
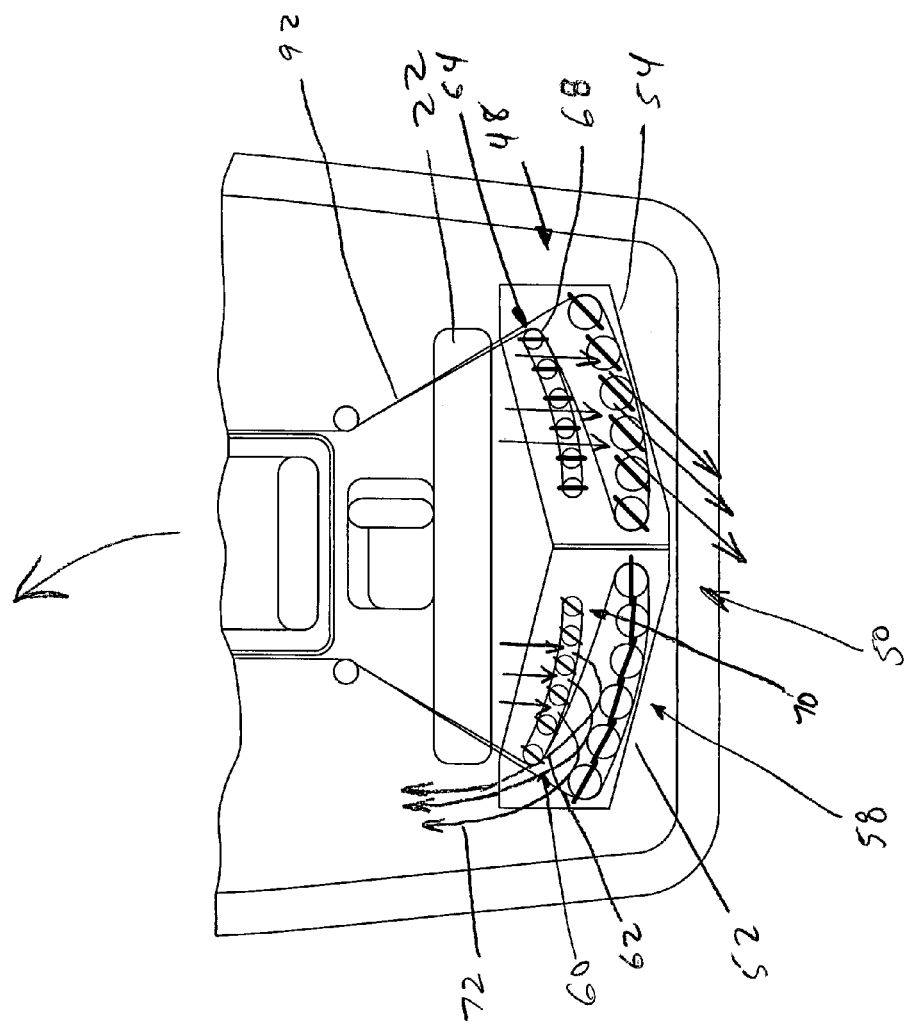
FIG. 22 is a top plan view of the left fin array and left vane array in a second position and the right fin array in an angled position.

Referring to FIG. 22, the air cushion vehicle 10 may be directed to make a small radius or quick turn to the right or left. An advantage to this particular movement is that the user may make very precise movements as desired. A quick turn to the left is described in detail. The quick turning of the air cushion vehicle 10 is accomplished by positioning the left fin array 52 to its second position 58. The left vane array 62 is in its second position 70 to direct the air from the thrust fan 22 away from the first direction 66 and angle the thrust flow before reaching the fin array 50. The right fin array 54 is in an angled position to direct the thrust flow in a leftward direction. The air leaving the right fin array 54 travels in a substantially angled leftward direction to cause the air cushion vehicle 10 to turn left. In order to make the air cushion vehicle 10 turn to the right, the positioning of the fin array 50 need only be reversed.

Figure 23:
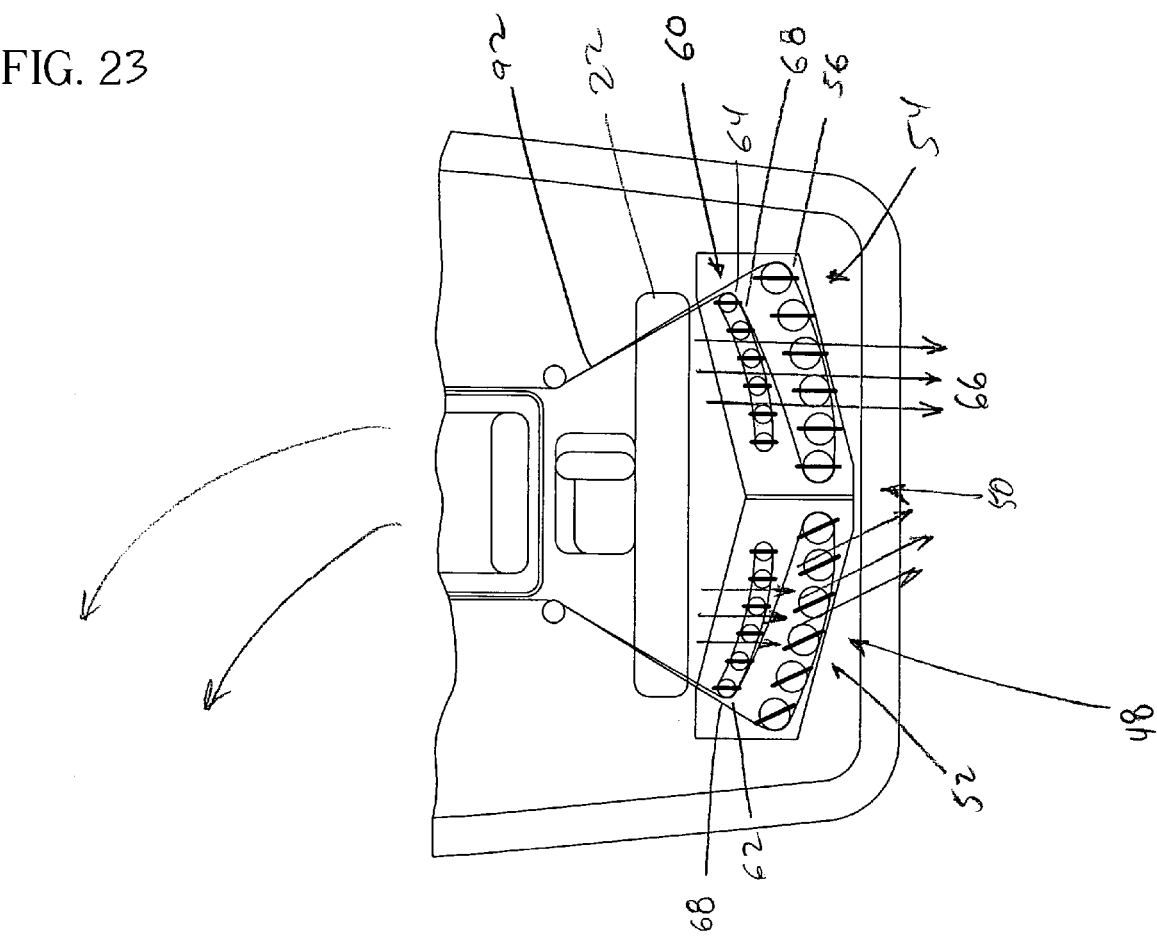
FIG. 23 is a top plan view of the left fin array in an angled position and the right vane array and right fin array in a first position.

Referring to FIG. 23, the air cushion vehicle may be directed to make a slow turn to the right or left. An advantage to this particular movement is that the user may wish to make a very slow turn in situations where a fast moving air cushion vehicle may be inappropriate. A slow turn to the left is described in detail. The slow turning of the air cushion vehicle 10 is accomplished by positioning the left fin array 52 so that it is angled to the right. The right fin array 54 remains in a first position 56 to direct the thrust flow in a rearward direction. The right 64 and left 62 vane arrays stay in the first position 68. The left fin array 52 will direct the thrust flow to the left to slowly turn the air cushion vehicle 10 to the left. In order to make the air cushion vehicle 10 slowly turn to the right, the positioning of the fin array 50 need only be reversed between the left fin array 52 and right fin array 54.

An advantage to the separate left fin array 52 and right fin array 54 and the left vane array 62 and right vane array 64 is that both the precision and quickness of the air cushion vehicle's turning may be modified and controlled by the user to fit their particular needs.

Referring back to FIGS. 1-6, the turning controller 48 may include a user control device 76 selectively activated by the user to actuate the left 52 and right portions 54 of the fin array to move it between the first position and second position. The user control device 76 may be an electric switch, electric solenoid or mechanical linkage that rotates the individual fins 24 of the fin array 50. The mechanical linkage may be a rotary drive that rotates the fins 24 and the vanes 26 in a coordinated movement. In an alternative embodiment, the turning controller may have the fins 24 and vanes 26 electrically rotated. The user control device 76 may be activated by the user to create an electronically generated signal that actuates a drive motor that rotates the fins 24 and vanes 26 in a coordinated manner. The rotation of the fins 24 and the vanes 26 may be obtained using a rotary drive or a linear linkage.

Figure 18:
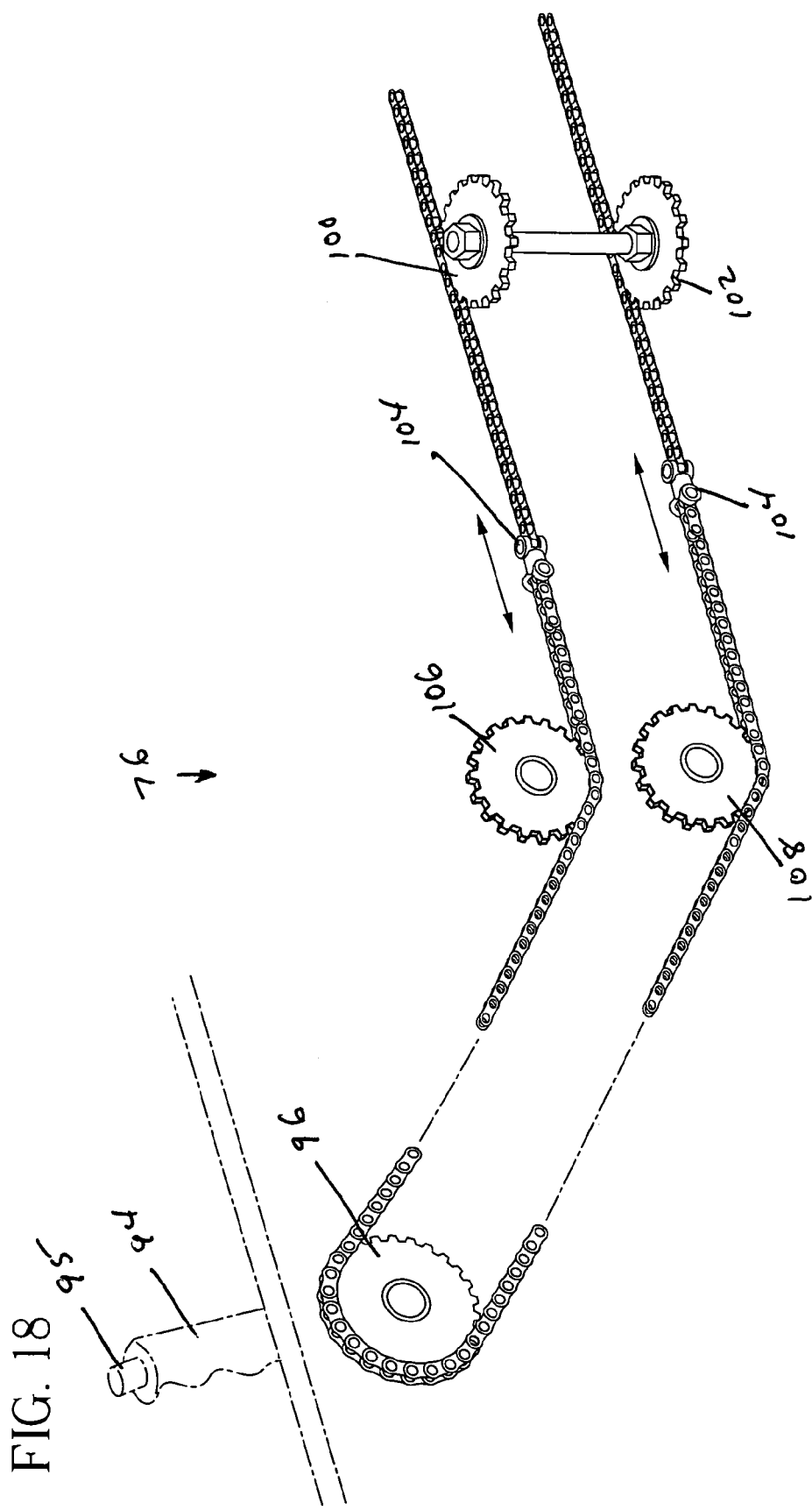
FIG. 18 is a perspective view of a portion of the turning controller shown in FIG. 1.

A preferred embodiment of a turning controller 48 for moving the fin array 50 is shown in FIG. 2. The turning controller 48 is shown to have a left 78 and a right 80 user control device 76 to selectively control the fin array 50 and vane array 60. The user control device 76 as shown in FIGS. 1, 2 and 18 is a series of sprockets and chains. The left side turning controller 48 and the left fin array 52 and left vane array 62 is described in detail with the right turning controller 48 being identical in construction.

Figure 20:
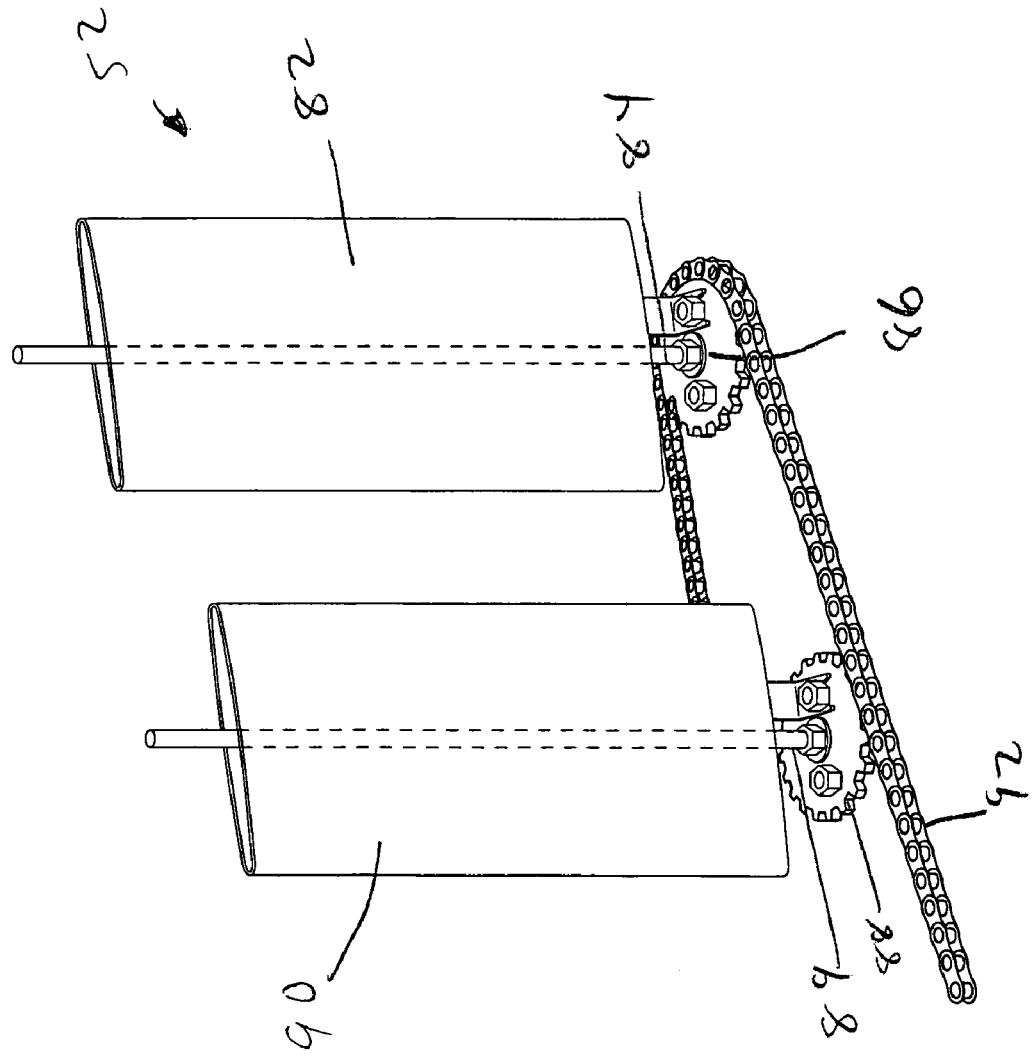
FIG. 20 is a partial top perspective view of a portion of the fin array of the present invention.

Referring to FIGS. 2 and 20, the left fin array 52 has a first fin 82 that is rotatably mounted by a first shaft 84 to the support body 12. The first fin 82 has at least one second fin 90 positioned adjacent and operatively connected to the first fin 82 to move in a coordinated parallel relation with the first fin 82. The first fin 82 may have a first drive sprocket 86 attached to the first fin shaft 84. The first drive sprocket 86 may be connected to the left side turning controller 48 wherein the activation of the left turning controller 48 rotates the first fin 82 by the first drive sprocket 86. The second fin 90 has a first rotating sprocket 88 which is attached to a second fin shaft 89. The first rotating sprocket 88 and first drive sprocket 86 may be mechanically connected to each other so that the rotation of the first drive sprocket 86 causes a coordinated parallel rotation of the first rotating sprocket 88. The first drive sprocket 86 and first rotating sprocket 88 may be mechanically connected using a drive chain 92.

Referring to FIGS. 2 and 20, the drive chain 92 is connected to the first drive sprocket 86 and continues to contact the first rotating sprocket 88 on the second fin shaft 89 and the remaining rotating sprockets of the left fin array 52. The drive chain 92 is positioned so that it forms a closed loop. The left side turning controller 48 may include a lever 94 attached to a main sprocket 96 pivotally mounted to the seating compartment 98 so that its axis of rotation is in a horizontal direction. The drive chain 92 coming off of the fin array 50 may be directed toward the seating compartment 98 by a first 100 and second idler gear 102 attached to the support body 12 to allow for rotation about a vertical axis. The drive chain 92 is then connected to pivot device 104 (FIG. 18) so that the drive chain 92 may be directed in a vertical direction. In a preferred embodiment, the pivot device 104 may be a turnbuckle or universal joint. The drive chain 92 is directed up vertically toward the main sprocket 96 by a third 106 and fourth idler gear 108 attached to a sidewall of the seating compartment 98 (FIGS. 1 and 18). The drive chain 92 is then connected to the main sprocket 96 to form a closed loop such that rotation of the main sprocket 96 by pushing and pulling on the lever 94 causes a rotation of the first drive sprocket 86 which in turn causes a parallel coordinated turning of the rotating sprockets 88 attached to each of the remaining fins 24 in the left fin array 52.

Figure 21:
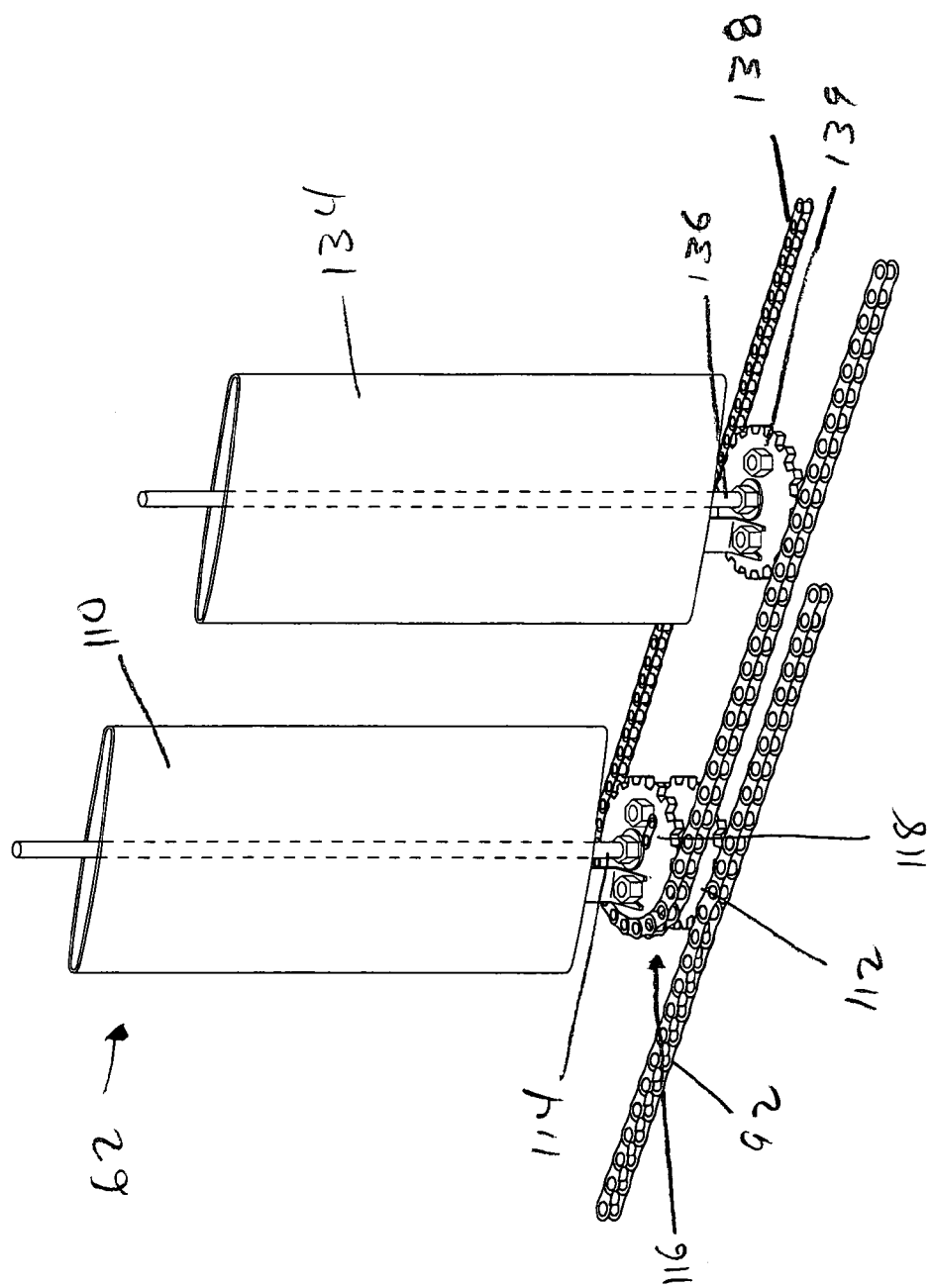
FIG. 21 is a partial top perspective view of a portion of the vane array of the present invention.

Referring to FIGS. 2 and 21, a first vane 110 of the left vane array 62 may be connected to move in a coordinated movement with the rotation of the first fin 82. Preferably the first vane 110 will be connected so that it will only rotate when the left fin array 52 is placed in its second closed position 58. The first vane 110 will rotate back to its first position 68 after the left fin array 52 is moved from its second closed position 58. The first vane 110 may be rotatably mounted to the support body by a first vane shaft 114. As shown in FIGS. 1 and 2, the first vane 110 is connected to the drive chain 92 that is connected to the user left side turning controller 48 and the first fin 82. The first vane 110 has a second sprocket 112 attached to the first vane shaft 114 that is rotated by the movement of the drive chain 92. Preferably, the first vane 110 is moved in a coordinated manner in relation to the movement of the first fin 82, such that the first vane 110 will only move to its second position 70 when the first fin 82 is in its second position.

Referring to FIGS. 7-9 and 21, a clutch mechanism 116 may be attached to the first vane 110 to selectively control the actuation of the first vane 110. The clutch mechanism 116 allows for the selective actuation of the first vane 110 and allows the drive chain 92 to move a predetermined distance before the first vane 110 rotates. When the first fin 82 is moved to its second position, the clutch mechanism 116 will engage and allow rotation of the first vane 110 to the second angled position 70.

The clutch mechanism 116 may have a second sprocket 112 that contacts the drive chain 92. The second sprocket 112 may rotate about the first vane shaft 114 without actuating the first vane 110. Located above the second sprocket 112 is an upper sprocket 118 which may be identical in shape. However, the upper sprocket 118 is fixedly connected to the first vane shaft 114. The upper sprocket 118 may have a first post 120 and a second post 122 extending downwardly from the upper sprocket 118 towards the second sprocket 112. The first post 120 is positioned radially outward from the first vane shaft 114 and a second post 122 is offset from the first post 120. The second sprocket 112 has an upwardly extending extension 124 which may engage either the first 120 or second post 122. As shown in FIG. 9, the first vane 110 is in the second angled position 70. The second angled position 70 is obtained when the second sprocket 112 is also rotated in a clockwise direction about the first vane shaft 114 and the extension 124 contacts the first post 120 to rotate the vane 26 in clockwise direction. It should be noted that there is an angle of rotation between the first post 120 and the second post 122 that allows the second sprocket 112 to move freely about the first vane shaft 114 without actuating the first vane 110. This allows the first vane 110 to stay in a first position while the first fin 82 rotates from its first position 56 to its second closed position 58. The vane 26 as shown in FIG. 3 will only be rotated to its second position 70 when the fin 82 is in its second position 58.

When the user wishes to return the first vane 110 to its original first position 68, the first fin 82 will have to be rotated by the left side turning controller 48 from the second fin position 58. The first vane 110 will rotate about its shaft axis in a counter clockwise direction as will the upper sprocket 118. The extension 124 will disengage from the first post 120 and may be spring loaded to return to its original position. An extension member 128 may be attached to the upper sprocket 118. The extension member 128 may extend radially from the upper sprocket 118 terminating at a free end 130. The free end 130 is preferably attached to a resilient member 132 attached to the support body 12. The extension member 128 will not place any tension on the resilient element 132 when the first vane 110 is in its first position 68 as shown in FIG. 8. As the first vane 110 is rotated from its first position 68 to its second position 70, the extension member 128 will pull against the resilient element 132 as shown in FIG. 9. After the rotation of the first vane 110 the user will have to hold the left side turning controller 48 in place to keep the first vane 110 in its second position 70 against the force created by the resilient element 132. When the user wishes to return the first vane 110 to its first position 68, the user control device 76 may be actuated so that the second rotating sprocket 112 travels in a counter-clockwise direction. The resilient element 132 will pull the extension member 128 back to its original position and rotate the first vane 110 back to its first position 68. The upper sprocket 118 may be linked to the remaining vanes 26 in the left vane array 62 to allow for coordinating parallel movement of the vanes 26 when the first vane 110 is rotated.

Referring to FIGS. 1-6 and 21, at least one second vane 134 is positioned adjacent and in a linear line with the first vane 110 rotatably mounted vertically to the support body to rotate about a second shaft axis. A third rotating sprocket 139 is fixedly attached to the second vane shaft 136. The first vane 110 and second vane 134 may be mechanically connected by the upper sprocket 118 of the clutch mechanism 116 and the third rotating sprocket 139 using a second chain 138. The second chain 138 may be a closed circuit chain which connects the left vane array 62 vanes to each other, thereby allowing for coordinated movement of the first vane 110 the remaining vanes 26 in the left vane array 62.

Although that it has been shown that the turning controller 48 may be mechanically linked to the vane array 60 and fin array 50 it is within the contemplation of the present invention that other ways of controlling the rotation of the vane array 60 and the fin array 50 may be employed. It is contemplated that individual solenoid motors or electric motors may be attached to each individual vane or fin to rotate them as desired. So long as the movement is in a coordinated manner any number of motors or solenoids may be used to rotate the vanes. Further, it also contemplated that the chains and sprockets may be replaced with a pulley and belt system using either smooth belts or tooth belts or other mechanical linkage may be used.

Referring to FIG. 2, the air cushion vehicle 10 may also include turning position indicators 164 positioned near the leading edge 150 of the support body 12. The turning position indicators 164 may move in a coordinated movement to mimic the angle of the left fin array 52 and right fin array 54, respectively. Preferably, there are two turning position indicators 164 one for the right fin array 54 and one for the left fin array 52. In a preferred embodiment, the turning position indicators 164 may be electrically connected or mechanically connected to the turning controller 48. An advantage to having the indicators 164 connected to the turning controller 48 is that the user may easily see the positioning of the fin array 50 without having to look behind them.

Referring to FIGS. 14-17, the air cushion vehicle 10 may also include a plurality of support wheels 166 attached to a bottom surface 168 of the support body 12. The support wheels 166 allow the air cushion vehicle 10 to be supported on wheels 178 in addition to being supported by the lifting fan 20. The support wheels 166 preferably include a cylinder 170 or other shaped housing that extends downwardly from the support body 12. There may be four cylinders 170 one at each corner of the air cushion vehicle 10. Positioned inside of the cylinders 170 is a selectively actuable piston 172 that travels the length of the cylinder 170. The piston 172 may be attached to a piston rod 174 which extends through the support body 12. The piston rod 174 is attached to the support body 12 using a threaded nut 176 which is welded to the bottom surface 168 of the support body 12. The threaded rod 174 extends and retracts the piston 172 within the cylinder 170 by the user turning the threaded rod 174 to extend or retract the piston. Attached to a lower surface of the piston 172 is a wheel 178. The wheel 178 may be pivotally mounted to the lower surface to allow the wheel 178 to swivel about a vertical axis. The wheel 178 may pivot using ball bearings (not shown) and attached using screws 182 to the lower surface of the piston 172.

Figure 14:
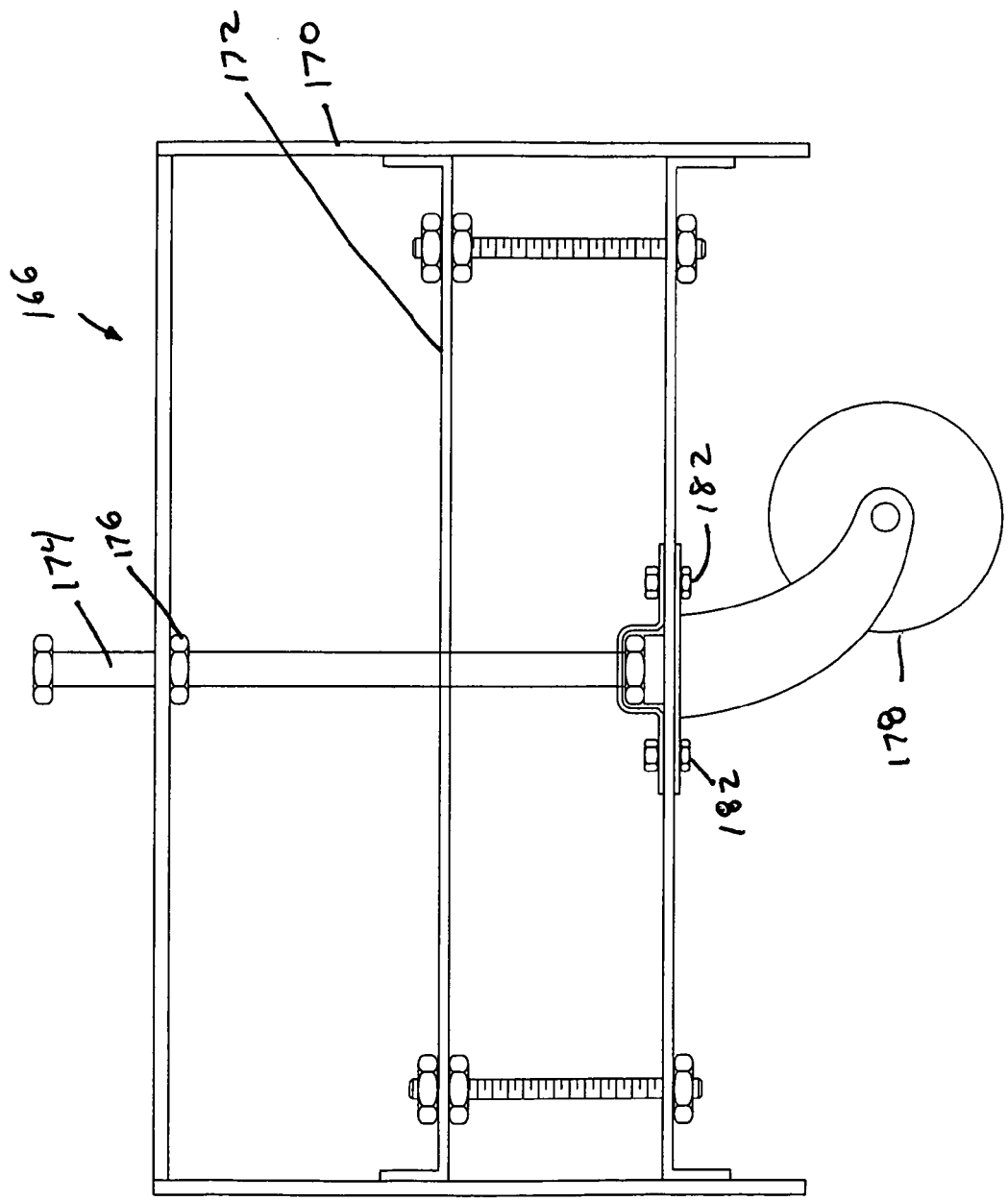
FIG. 14 is a cross-sectional view of a support wheel used in an air cushion vehicle of the present invention in an extended position.

As shown in FIG. 14, the support wheel 166 is shown in an extended position. In the extended position the wheel 178 extends beyond the lower edge of the cylinder 170 and supports the support body 12. An advantage to this particular design is that the air cushion vehicle 10 is not completely supported by the lifting fan 20 and a user may train themselves to learn the tendencies of the air cushion vehicle 10 using a substantially stable surface that is provided by the support wheels 166.

Figure 15:
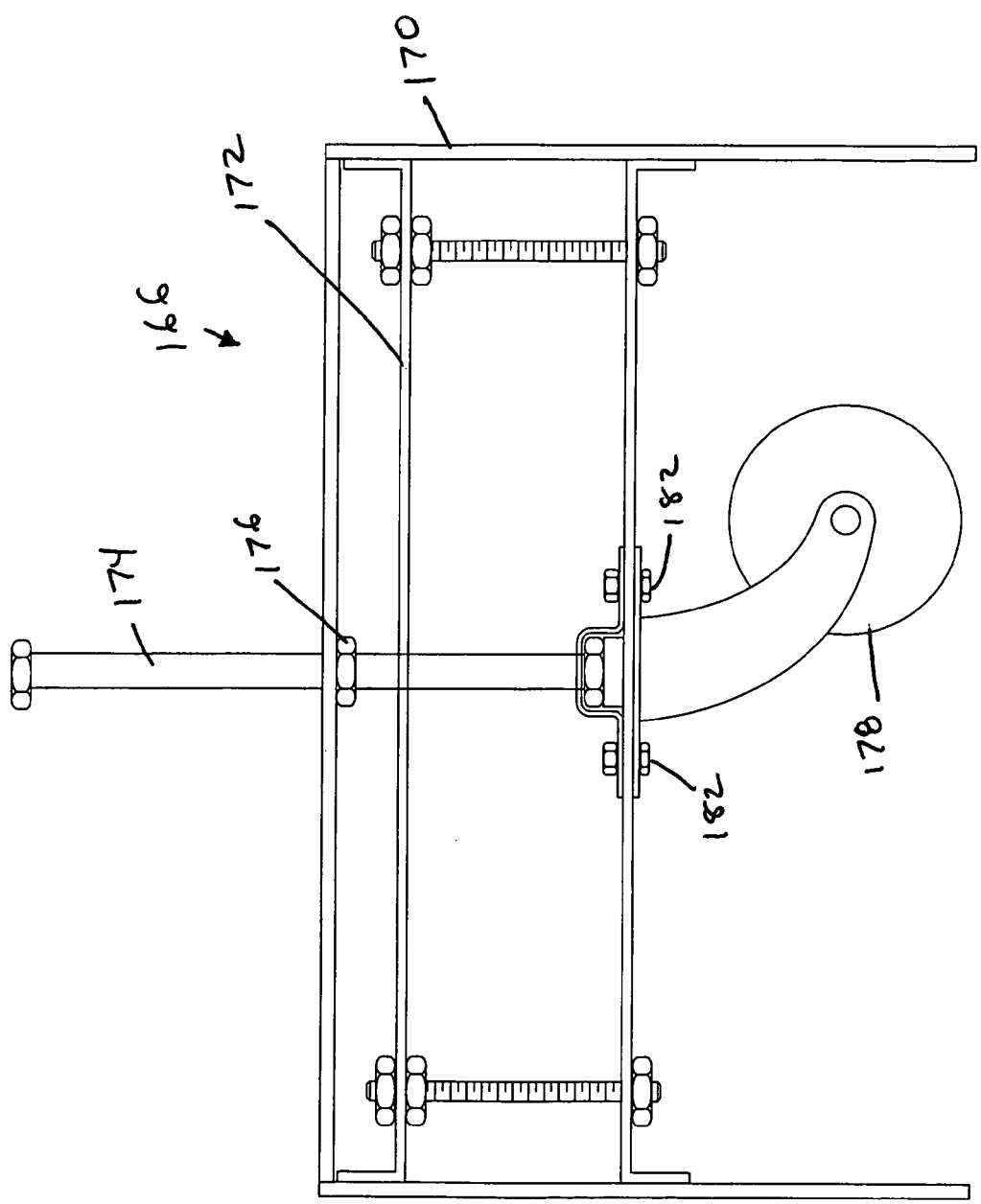
FIG. 15 is a cross-sectional view of a support wheel used in the air cushion vehicle of the present invention in a retracted position.

Referring to FIG. 15, the support wheel 166 is shown in a retracted position wherein the piston 172 and wheel 178 are retracted into the cylinder 170. In the retracted position, the support wheels 166 do not support the support body 12. Instead the lifting fan 20 will provide all of the support for lifting the air cushion vehicle 10 off the ground. Although it has been shown that the support wheels 166 are mechanically actuated using a threaded rod 174 to move the piston 170 it is envisioned that the pistons 170 may be pneumatically actuated with a pneumatic cylinder attached to the piston to retract and extend the piston within the cylinder.

As shown in FIGS. 1 and 2, the air cushion vehicle 10 may be of the size to allow a person to sit within the vehicle. The controller 38 for the lifting fan 20 and the thrust fan 22 may be left 140 and right 142 foot pedals that allow the user to selectively actuate the amount of variable of power supply to each fan independent of each other. The user may actuate the lift fan 20 and the thrust fan 22 using a foot pedal for each fan. However, it is also envisioned also that the air cushion vehicle 10 as shown in FIG. 1 could be of a size that is of a remote control or a model toy using servos and solenoid actuators connected to a remote control in a manner known in the art.

The air cushion vehicle 10 and the fin array 50 and vane array 60 allow for increased precision and maneuverability that was not obtainable with prior art air cushion vehicles. The increased maneuverability obtained by the present invention allows for the possibility of using the air cushion vehicle 10 for recreational games and activities.

Referring to FIG. 2, the air cushion vehicle may also include an object receiver 144 for selectively receiving and ejecting a playing object 146. The object receiver 144 may have curved portion 148 on the outer perimeter sized to accept the playing object. In a preferred embodiment, as shown in FIG. 2, the leading edge 150 of the support body 12 may have a depression sized to accept a spherical ball or puck therein. In a preferred embodiment, the playing object 146 may resemble a soccer ball or other spherical ball used in sports. The object receiver 144 with the curved portion allows the user to direct the vehicle 10 and push the playing object 146 about a playing field. The object receiver 144 may also include an ejector 152 which is selectively actuable for ejecting the playing object 146 out of the object receiver 144. The ejector 152 allows the user to forcefully push the playing object from the object receiver 144.

The ejector 152 as shown in FIG. 2 may have a first 154 solenoid and a second 156 solenoid having an ejector post 158 within an ejector housing 160 that is selectively actuable between a first closed position and a second open position. In the closed position the ejector post 158 is contained completely within the support body 12 and does not extend past the curved portion 148 of the object receiver 144. In this position the user may push the playing object 146 about a playing field with the air cushion vehicle 10. When the user wishes to eject the playing object 146 from the object receiver 144 the solenoid is actuated to extend the ejector post 158 out of the ejector housing 160 positioned in the support body 12. The playing object 146 will then be ejected out of the object receiver 144. As shown in FIG. 2 in a preferred embodiment there are two ejectors 152 positioned about the curved portion 148 of the object receiver 144. Preferably, a first ejector 152 is angled on the left side of the curved portion 148 having an oppositely angled second ejector 152. The user may selectively actuate each individual ejector 152 as desired to urge the playing object 146 out of the object receiver 144 in either an angled right or left direction or straight forward as desired. The solenoid may be an air actuated solenoid, however, it is contemplated it is also contemplated that any other type of ejection mechanism such as a mechanical spring loaded device or a pneumatic solenoid could be used. It is envisioned that the turning controller 48 may have on the top of each lever 94, an actuator button 95 (FIG. 18) that may be used to actuate the ejector 152 for both the right and left side as desired by the user.

Figure 12:
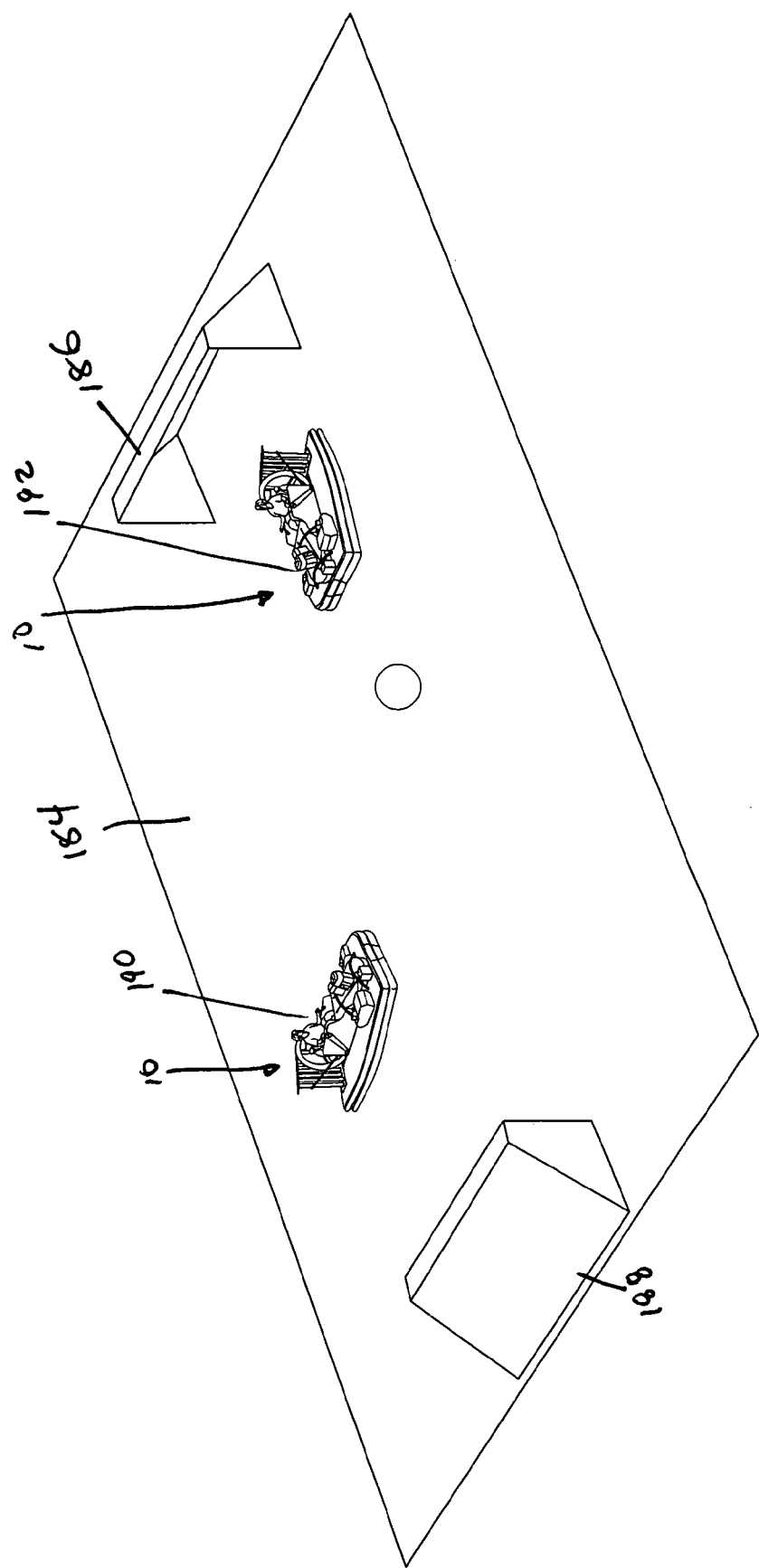
FIG. 12 is a top perspective view showing a playing field including a playing object and two air cushion vehicles in accordance with the present invention.

Referring to FIG. 12, a method of playing a game using the air cushion vehicle 10 of the present invention is contemplated. The game may be played to resemble the game of soccer. This game could be played on a soccer field 184 that is currently known in the art. The soccer field 184 may be a regulation size field or smaller when used with remote controlled air cushion vehicle toys. A first goal 186 and a second goal 188 are positioned at opposite ends of a soccer field 184. A freely moveable playing object 146 such as a round spherical ball may be weighted so that the ball will always stay on or in close proximity to the ground. The moveable playing object 146 may be sized proportionally to the air cushion vehicle 10 so that the air cushion vehicle 10 may move the playing object 146 and still be seen by the users. Referring to FIG. 12, two or more air cushioned vehicles 10 may be used to play the game. The first air cushion vehicle 190 may approach the freely movable playing object 146 and attempt to move the playing object 146 by either pushing it with the air cushion vehicle or by using the object receiver 144 and ejector 152 to shoot the playing object 146 to the first goal area 186. At the same time, the second air cushion vehicle 192 with the object receiver 144 and ejector 152 may be used to prevent the first air cushion vehicle 190 from scoring a goal and instead attempt to move the playing object 146 to shoot it into the second goal area 188. The playing object may resemble a soccer ball or any type of other sports equipment. It is envisioned that multiple air cushion vehicles 10 may be used at the same time such that two to three air cushioned vehicles 10 may be on either team to score goals on the opposing goal.

Figure 13:
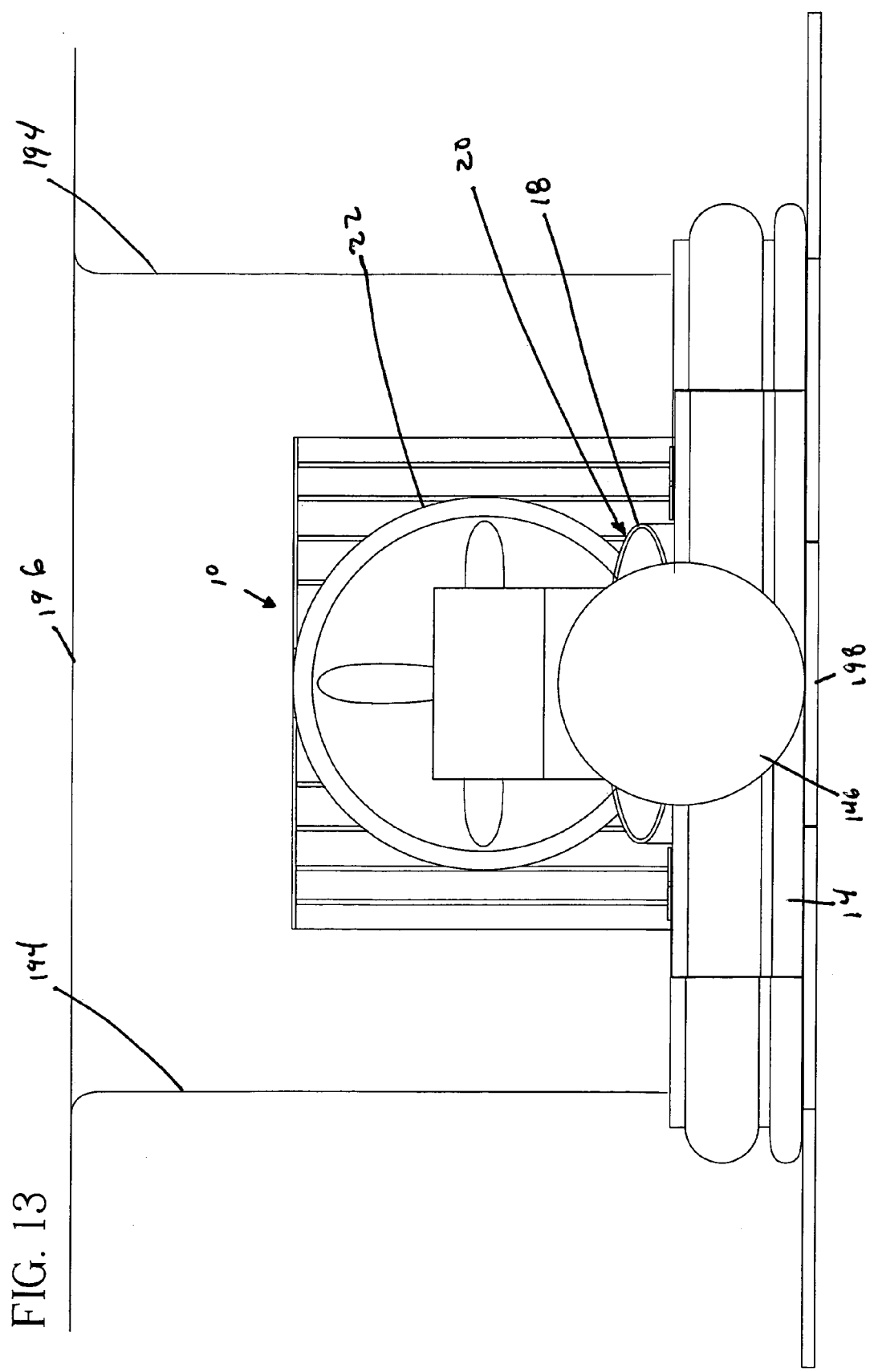
FIG. 13 is a front elevational view of the air cushion vehicle of the present invention that is electrically powered.

It is also envisioned that the air cushioned vehicle 10 of the present invention could be used as an electrically powered vehicle that is used on a surface that is similar to that used by bumper cars known in the art. As shown in FIG. 13 the air cushioned vehicle 10 shown to have two upwardly extending rods 194 which extend up to a positively charged netting 196 or cage made of a metallic material that is electrified. The floor can have negatively charged metal plates 198. The air cushioned vehicle 10 may travel over this surface and may be used to play the above described game. In this particular embodiment, the lifting fan 20, thrust fan 22 and object receiving device 144 may all be electrically powered. The power is supplied to the air cushion vehicle 10 through the positively charged upper netting where the electrical current travels down through the upwardly extending rods 190 with curved metallic ends that create an electrical connection between the positively charged netting on the top and the air cushion vehicle 10 and floor.

Figure 24:
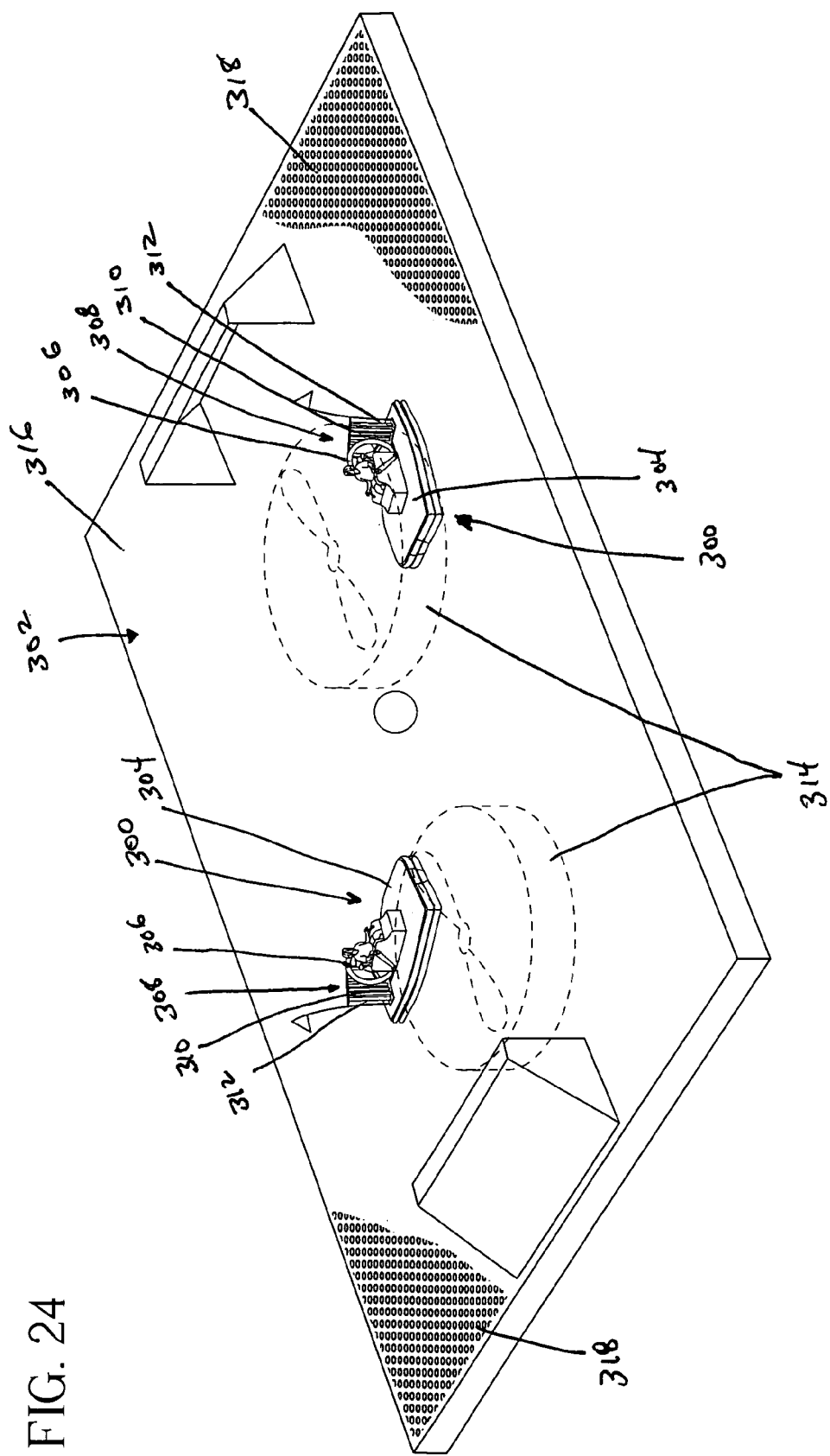
FIG. 24 is a top perspective view showing two air cushion vehicles in accordance with the present invention on an air cushion table.

Referring to FIG. 24, an air cushion vehicle 300 could be made into a small remote control model used on an air cushion table 302 or air hockey style table known in the art. The air cushion vehicle 300 is a small remote control craft having a support body 304 and a single thrust fan 306 that directs air in a substantially rearward direction. A turning assembly 308 can be of a similar design as described earlier and shown in FIG. 2. However, the turning assembly 308 can be actuated using servos that are remote controlled by a user as known in the art. The turning assembly 308 can have a fin array 310 positioned downstream a vane array 312. The operation of the fin array 310 and vane array 312 is similar to design shown in FIG. 2. The air cushion table 302 is of a design is known in the art. There can be a plurality of fans 314 which direct air upwardly through table surface 316 having a plurality of holes 318. The fans 314 produce an upward force that causes the air cushion vehicle 300 to levitate above the air cushion table 302. Thus, the remote controlled air cushion vehicle 300 does not need a lifting fan attached to the support body 304.

Although illustrative embodiments of the present invention have been described herein with reference to the accompanying drawings, it is understood that the invention is not limited to those precise embodiments and that other various changes and modifications may be effected therein by one skilled in the art without departing from the scope or spirit of the invention, and that it is intended to claim all such changes and modifications that fall within the scope of the invention.

What is claimed is:

1. An air cushion vehicle comprising:
   a support body:
   a skirt body extending downwardly from said support body around an outer perimeter thereof;
   a lifting fan positioned in said support body to discharge air in a generally downward direction to lift said support body in an upward direction;
   a thrust fan supported on said support body, said thrust fan directing thrust fan air in a first direction generally rearward to create a thrust flow;
   a controller for supplying power at a variable level to said lifting fan and said thrust fan;
   a plurality of fins positioned behind said thrust fan for directing said air cushion vehicle;
   a plurality of vanes positioned in said thrust flow between said thrust fan and said plurality of fins, said plurality of vanes having a first position for directing the thrust flow in a generally rearward direction to permit a generally forward direction of vehicle travel, said plurality of vanes having a second position for redirecting the thrust flow onto said plurality of fins, and said plurality of fins being positioned to further redirect the thrust flow in a generally forward direction to reverse the direction of vehicle travel; and
   a turning controller for selectively actuating said plurality of vanes.

2. The air cushion vehicle as defined in claim 1, wherein said plurality of fins are positioned in a curved arc behind said thrust fan.

3. The air cushion vehicle as defined in claim 2, wherein said plurality of fins are divided into a right fin array and a left fin array in equal numbers.

4. The air cushion vehicle as defined in claim 2, wherein said plurality of fins are arranged in an arc of 165° behind the thrust fan.

5. The air cushion vehicle as defined in claim 4, wherein said turning controller is connected to said plurality of fins.

6. The air cushion vehicle as defined in claim 1, wherein said plurality of fins have a substantially flat configuration and are pivotally mounted to said support body and positioned longitudinally in a substantially vertical direction behind the thrust fan.

7. The air cushion vehicle as defined in claim 6, wherein said plurality of fins are selectively positionable between a first open position and a second closed position, and in said first open position, said plurality of fins allows air from said thrust fan to pass by said plurality of fins in a first direction, and in said second closed position a flat side of said plurality of fins are positioned substantially perpendicular to the first direction of air flow from said thrust fan to deflect the air flow.

8. The air cushion vehicle as defined in claim 1, wherein said plurality of vanes are positioned in a substantially linear line behind said thrust fan.

9. The air cushion vehicle as defined in claim 1, wherein said plurality of vanes have a substantially flat configuration and are pivotally mounted to said support body positioned longitudinally in a substantially vertical direction behind the thrust fan and pivotally rotatable between the first position that allows air from said thrust fan to pass by said plurality of vanes in a first direction, and the second position wherein a flat side of said plurality of vanes are at an angle away from said first direction.

10. The air cushion vehicle as defined in claim 9, wherein said second position of said plurality of vanes is an angled position having an angle of approximately 45° from the first direction.

11. The air cushion vehicle as defined in claim 1, wherein said plurality of vanes are positioned in a substantially linear line behind said thrust fan, and said plurality of vanes are divided into an independently actuable right vane array and left vane array.

12. The air cushion vehicle as defined in claim 1, further comprising an object receiver for selectively receiving and ejecting a playing object into the support body.

13. The air cushion vehicle as defined in claim 12, wherein said object receiver further comprises a curved surface positioned on the outer perimeter of the support body sized to accept said playing object.

14. The air cushion vehicle as defined in claim 12, wherein said object receiver further includes a selectively actuable ejector positioned in said support body for selectively ejecting said playing object out of said object receiver.

15. The air cushion vehicle as defined in claim 14, wherein said ejector further comprises an air actuated solenoid having an ejection post selectively actuable between a first closed position and a second open position, wherein said second open position allows the ejector to forceably eject the playing object from the object receiver.

16. The air cushion vehicle as defined in claim 15, wherein said ejector further comprises at least two air actuated solenoids having ejection posts oppositely positioned within said object receiver.

17. The air cushion vehicle as defined in claim 1, wherein said turning controller further comprises:
   a first fin rotatably mounted to said support body by a first fin shaft,
   a first vane rotatably mounted to said support body by a first vane shaft and operatively connected to said first fin, wherein when said first fin rotatably moves and the rotation of the first fin actuates said first vane; and
   a user control device for selectively activating said first fin.

18. The air cushion vehicle as defined in claim 17, wherein said turning controller further comprises at least one second fin rotatably mounted to said support body by a second fin shaft positioned adjacent and operatively connected to said first fin to move in a coordinated movement with said first fin.

19. The air cushion vehicle as defined in claim 18, wherein said first fin is mechanically linked to said at least one second fin.

20. The air cushion vehicle as defined in claim 18, wherein said first fin and said at least one second fin are actuated using individual solenoids to move said first fin and said at least one second fin in a coordinated movement to each other.

21. The air cushion vehicle as defined in claim 18, wherein said turning controller further comprises:
   a first drive sprocket attached to said first fin shaft, wherein the activation of said user control device rotates the first fin with said first drive sprocket, and
   a first rotating sprocket attached to said second fin shaft of said at least one second fin, said first rotating sprocket is connected to said first drive sprocket, wherein the rotation of the first fin causes a coordinated movement of said at least one second fin.

22. The air cushion vehicle as defined in claim 21, wherein said first drive sprocket and said first rotating sprocket are connected using a chain.

23. The air cushion vehicle as defined in claim 21, wherein said first drive sprocket and said first rotating sprocket are connected using a belt.

24. The air cushion vehicle as defined in claim 21, wherein said turning controller further comprises:
   a clutch mechanism including a second rotating sprocket attached to said first vane shaft, said clutch mechanism is operatively connected to said first drive sprocket, wherein rotation of the first fin actuates said clutch mechanism from an engaged or disengaged position, said engaged position allowing a coordinated rotation of said first vane and said first fin, and said disengaged position of said clutch mechanism allowing for rotation of said first fin without rotating said first vane.

25. The air cushion vehicle as defined in claim 24, wherein said sprockets are operatively connected using a chain.

26. The air cushion vehicle as defined in claim 24, wherein said sprockets are operatively connected using a belt.

27. The air cushion vehicle as defined in claim 17, wherein said turning controller further comprises at least one second vane rotatably mounted to said support body by a second vane shaft adjacent said first vane and operatively connected to said first vane to move in a coordinated movement when said first vane is moved.

28. The air cushion vehicle as defined in claim 27, wherein said first vane is mechanically linked to said at least one second vane.

29. The air cushion vehicle as defined in claim 27, wherein said first vane and said at least one second vane are actuated using individual solenoids to move said first vane and said at least one second vane in a coordinated movement.

30. The air cushion vehicle as defined in claim 17, wherein said user control device further comprises a hand operated lever for activating said turning controller.

31. The air cushion vehicle as defined in claim 30, wherein said turning controller allows for independent actuation of said first fin and said first vane.

32. The air cushion vehicle as defined in claim 31, wherein said turning controller includes a turning position indicator.

33. The air cushion vehicle as defined in claim 32, wherein said plurality of fins form a right fin array and a left fin array and said turning position indicator includes a left turning position array indicator and a right turning position indicator for indicating the direction of said left fin array and said right fin array, wherein said left turning position indicator and said right turning position indicator are operatively connected to said left fin array and said right fin array.

34. The air cushion vehicle as defined in claim 1, wherein said skin body further comprises:
   a substantially cylindrical skirt body having an upper portion extending around an outer perimeter of said support body, and a lower portion extending downwardly from said support body;
   at least one vent on said lower portion of the skirt body, said at least one vent allowing air in said skirt body to escape in a downward direction through said skirt body; and
   a skirt extension extending from said lower portion of said skirt body, said skirt extension is positioned adjacent said at least one vent for spacing the skirt body a predetermined distance above a ground surface.

35. The air cushion vehicle as defined in claim 34, wherein said skirt extension extends substantially around the entire perimeter of the skirt body, said skirt extension extends downwardly toward the ground.

36. The air cushion vehicle as defined in claim 34, wherein said skirt extension is made of a flexible rubber material.

37. The air cushion vehicle as defined in claim 1, wherein said controller comprises a first foot pedal for selectively controlling and providing variable power to said lifting fan, and a second foot pedal for selectively controlling and providing variable power to said thrust fan.

38. The air cushion vehicle as defined in claim 1, wherein said skirt further includes a removable substantially flat member on said lower portion of said skirt body form a substantially flat bottom surface.

39. The air cushion vehicle as defined in claim 1, wherein said support body has at least one hinged portion allowing said support body to fold upon itself to facilitate storage of said air cushion vehicle.

40. The air cushion vehicle as defined in claim 39, wherein said hinged support body further comprises two parallel hinged portions dividing said support body into thirds, said hinged portions allowing said support body to be folded into a substantially U-shape to allow for ease of storage and movement.

41. The air cushion vehicle as defined in claim 1, wherein said support body further includes a plurality of selectively actuated support wheels attached to a bottom surface of said support body.

42. The air cushion vehicle as defined in claim 41, wherein said plurality of support wheels have an extended position allowing for said support body to be supported above the ground, and a retracted position allowing for said support body to be lifted above the ground by said lifting fan.

43. The air cushion vehicle as defined in claim 42, wherein a support wheel from said plurality of support wheels comprises:
   a cylinder attached to said bottom surface of said support body;
   a selectively actuable piston slidably positioned in said cylinder for moving said support wheel into a retracted position and extended position; and
   a wheel attached to a lower surface of said piston, said wheel being mounted to swivel about a vertical axis.

44. The air cushion vehicle as defined in claim 43, wherein said piston includes a threaded rod.

45. The air cushion vehicle as defined in claim 43, wherein said support wheel is actuated by a pneumatic cylinder attached to said piston.

46. An air cushion vehicle comprising:
a frame:
a skirt extending around a perimeter of said frame;
an air flow generator including a lifting fan disposed on said frame to discharge air in a generally downward direction providing a lift flow to lift said frame in an upward direction, and a thrust fan disposed on said frame, said thrust fan directing thrust fan air in a first direction generally rearward to create a thrust flow;
a first vane disposed on said frame to direct said thrust flow;
a first fin disposed on said frame downstream of said first vane for directing said thrust flow;
a turning controller for moving said first vane to affect the direction or motion of said vehicle, said first vane and said first fin cooperating to selectively redirect the thrust flow in a generally forward direction to reverse the direction of vehicle travel.

47. The air cushion vehicle as defined in claim 46, wherein a plurality of fins are positioned in a curved arc downstream said thrust flow to form an array of fins.

48. The air cushion vehicle as defined in claim 47, wherein said plurality of fins are divided into a right fin array and a left fin array in equal numbers.

49. The air cushion vehicle as defined in claim 48, wherein said plurality of fins are pivotally mounted to said frame and positioned longitudinally in a substantially vertical direction behind the thrust flow.

50. The air cushion vehicle as defined in claim 47, wherein said plurality of fins are arranged in an arc of 165° behind the thrust flow.

51. The air cushion vehicle as defined in claim 47, wherein said plurality of fins have a first open position to allow said thrust flow to pass by said plurality of fins in a first direction, and a second closed position wherein a flat side of said plurality of fins are positioned substantially perpendicular to the first direction of said thrust flow.

52. The air cushion vehicle as defined in claim 47, wherein a plurality of vanes are positioned substantially linearly in a line behind said thrust flow.

53. The air cushion vehicle as defined in claim 52, wherein said plurality of vanes are pivotally mounted to said frame and positioned longitudinally in a substantially vertical direction and are pivotally rotatable between a first position that allows said thrust flow to pass by said plurality of vanes in a first direction, and a second position wherein a flat side of said plurality of vanes are at an angle away from the first direction to direct the air away from the first direction to a second direction.

54. The air cushion vehicle as defined in claim 53, wherein said second position of said plurality of vanes is an angled position having an angle of approximately 45° from the first direction.

55. The air cushion vehicle as defined in claim 54, wherein said plurality of vanes have an independently actuable right vane array and a left vane array.

56. The air cushion vehicle as defined in claim 52, wherein said turning controller is connected to said plurality of vanes and said plurality of fins, said plurality of vanes being selectively actuable as desired by the user through said turning controller.

57. The air cushion vehicle as defined in claim 46, further including a second vane disposed on said frame to direct said thrust flow.

58. The air cushion vehicle as defined in claim 57, wherein said first and second vanes move in a coordinated manner to affect the movement of the vehicle.

59. The air cushion vehicle as defined in claim 57, further including a second fin disposed on said frame downstream of said second vane for directing said thrust flow.

60. The air cushion vehicle as defined in claim 59, wherein said first and second vanes are positionable to direct the thrust flow onto the first and second fins, and said first and second fins are positioned to redirect the thrust flow in a generally forward direction.

61. The air cushion vehicle as defined in claim 59, wherein said first vane and said second vane are positionable to redirect the thrust flow generally laterally in opposite directions onto said first and second fins.

62. The air cushion vehicle as defined in claim 59, wherein said first vane is positionable to redirect the thrust flow onto the first fin and said second vane is positionable to permit the thrust flow to exit past the second vane, thereby causing the vehicle to turn in a first direction.

63. The air cushion vehicle as defined in claim 46, wherein said air cushion vehicle is electrically powered.

64. The air cushion vehicle as defined in claim 63, wherein said air cushion vehicle further includes at least one upwardly extending rod adapted to engage an electrified surface.

65. An air cushion vehicle comprising:
a frame;
a skirt extending around a perimeter of said frame;
an air flow generator including a thrust fan supported on said frame, said thrust fan directing thrust fan air in a first direction generally rearward to create a thrust flow and an air cushion table positioned below said frame to discharge air in a generally upwardly direction to create a lift flow to lift said frame in an upward direction;
a first vane disposed on said frame to direct said thrust flow;
a first disposed on said frame downstream of said first vane for directing said thrust flow;
a turning controller for moving said first vane to affect the direction or motion of said vehicle, said first vane and said first fin cooperating to selectively redirect the thrust flow in a generally forward direction to reverse the direction of vehicle travel.

66. The air cushion vehicle as defined in claim 65, wherein said air cushion table includes:
a flat surface containing a plurality of holes therethrough; and
at least one lifting fan positioned below the surface of said table to discharge air upwardly through said plurality of holes to create a lifting force under said air cushion vehicle.

67. An air cushion vehicle comprising:
a frame;
a skirt extending around a perimeter of said frame;
an air flow generator for providing lift flow and thrust flow;
a first vane disposed on said frame to direct said thrust flow;
a first fin disposed on said frame downstream of said first vane for directing said thrust flow;
a turning controller for moving said first vane to affect the direction or motion of said vehicle, said first vane and said first fin cooperating to selectively redirect the thrust flow in a generally forward direction to reverse the direction of vehicle travel; and
at least one upwardly extending rod adapted to contact a positively charged netting positioned above said air cushion and adapted to be electrically coupled to a negatively charged floor positioned substantially parallel and opposite said positively charged netting to provide electrical power to the vehicle.

* * * * *